United States Patent
Kang et al.

(10) Patent No.: US 8,711,883 B2
(45) Date of Patent: Apr. 29, 2014

(54) MULTIPLE CARRIER COMPRESSION SCHEME

(75) Inventors: Justin Kang, Ipswich (GB); Alan McGuire, Felixstowe (GB)

(73) Assignee: British Telecommunications Public Limited Company, London (GB)

( * ) Notice: Subject to any disclaimer, the term of this patent is extended or adjusted under 35 U.S.C. 154(b) by 373 days.

(21) Appl. No.: 13/056,147

(22) PCT Filed: Jul. 29, 2009

(86) PCT No.: PCT/GB2009/001862
§ 371 (c)(1),
(2), (4) Date: Jan. 27, 2011

(87) PCT Pub. No.: WO2010/012996
PCT Pub. Date: Feb. 4, 2010

(65) Prior Publication Data
US 2011/0128975 A1    Jun. 2, 2011

(30) Foreign Application Priority Data
Jul. 30, 2008    (GB) .................................. 0813953.7

(51) Int. Cl.
*H04J 3/18*    (2006.01)
*H04L 29/06*    (2006.01)

(52) U.S. Cl.
CPC .................................... *H04L 69/04* (2013.01)
USPC ............................. 370/477; 370/389; 370/392

(58) Field of Classification Search
None
See application file for complete search history.

(56) References Cited

U.S. PATENT DOCUMENTS

| 6,032,197 | A  | * | 2/2000 | Birdwell et al. ............... 709/247 |
| 2003/0142669 | A1 | | 7/2003 | Kubota et al. |
| 2004/0001508 | A1 | | 1/2004 | Zheng et al. |
| 2006/0075134 | A1 | * | 4/2006 | Aalto et al. .................... 709/238 |
| 2007/0002850 | A1 | * | 1/2007 | Guichard et al. ............. 370/389 |
| 2007/0130475 | A1 | | 6/2007 | Sathyanath et al. |
| 2008/0117906 | A1 | | 5/2008 | Xie |
| 2011/0122893 | A1 | | 5/2011 | Kang et al. |

FOREIGN PATENT DOCUMENTS

| EP | 1 283 630 A2 | 2/2003 |
| WO | WO 02/30043 A2 | 4/2002 |

OTHER PUBLICATIONS

International Search Report and Written Opinion from International Application No. PCT/GB2009/001864 dated Oct. 16, 2009.
Salam et al, "Provider backbone bridging in MPLS: Complementary technologies for next-generation carrier ethernet transport" IEEE Communications Magazine. vol. 45, No. 3 Mar. 2008. pp. 78-79.
Application and File History for U.S. Appl. No. 13/056,152, filed Jan. 27, 2011, inventors Kang et al.

* cited by examiner

*Primary Examiner* — Hassan Kizou
*Assistant Examiner* — Tejis Daya
(74) *Attorney, Agent, or Firm* — Patterson Thuente Pedersen, P.A.

(57) ABSTRACT

A method of reducing the bandwidth required to send a plurality of client traffic frames over a plurality of carrier communications networks is disclosed. Related communications system, data stores and boundary nodes are also disclosed.

10 Claims, 15 Drawing Sheets

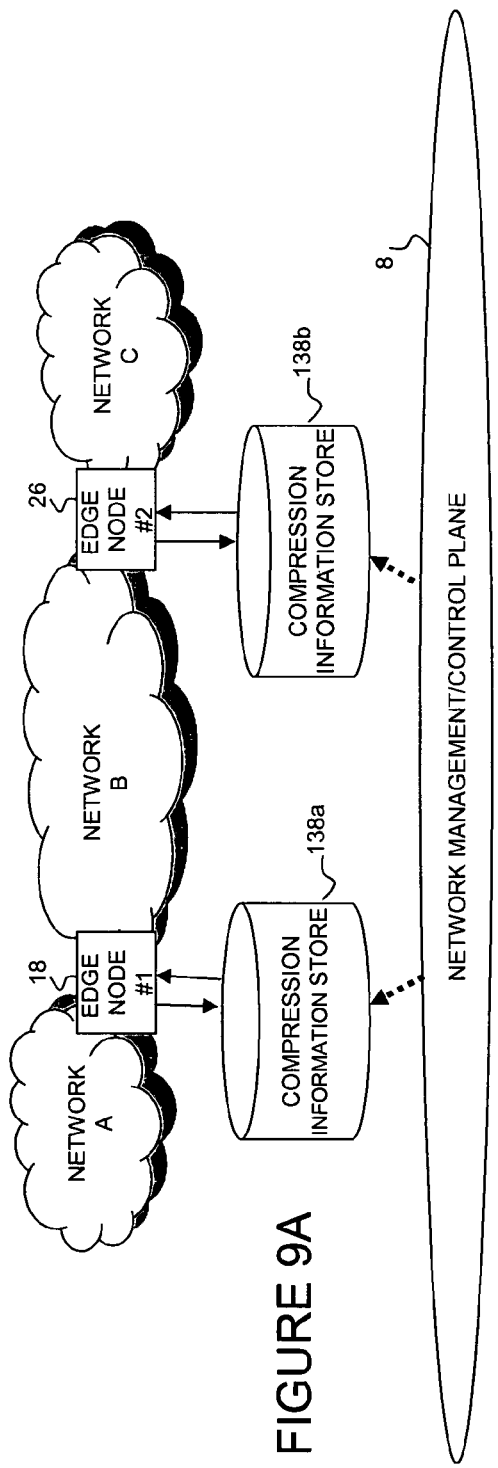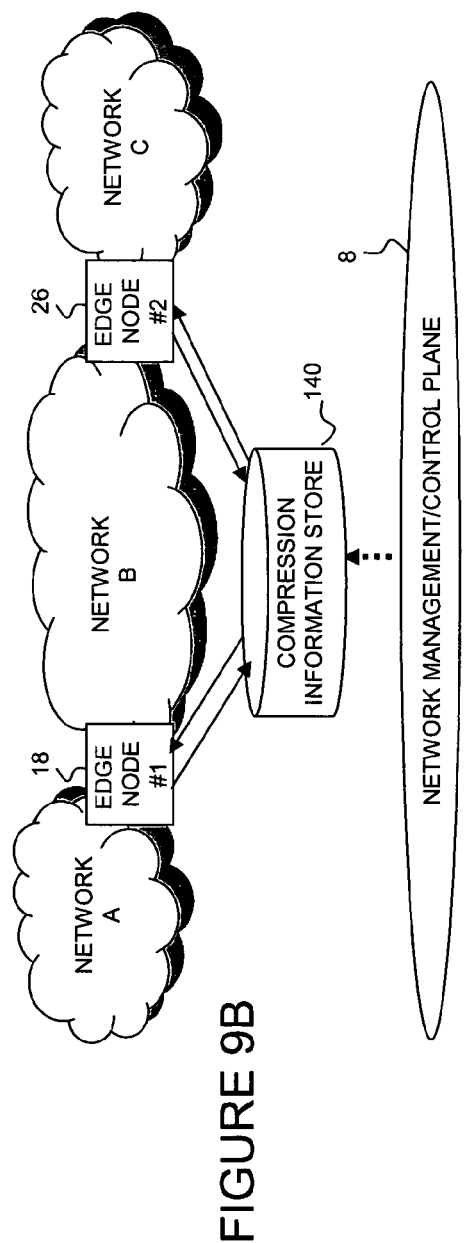
FIGURE 9A
FIGURE 9B

MULTIPLE CARRIER COMPRESSION SCHEME

CROSS-REFERENCE TO RELATED APPLICATIONS

This application is a U.S. national stage application of International Application No. PCT/GB2009/001862, filed Jul. 29, 2009, which designated the U.S. and claims the benefit of Great Britain Patent Application No. 0813953.7 filed Jul. 30, 2008, both of which are incorporated herein by reference in their entireties.

TECHNICAL FIELD

The present invention relates to a header compression scheme, in particular but not exclusively to a header compression scheme which improves the bandwidth efficiency of carrier Ethernet communication protocols, for example when a plurality of carrier services are utilized by client traffic.

BACKGROUND ART

Ethernet was originally devised as a local area network (LAN) communications protocol which operates in a connection-less "packet" or "frame" based communications mode. Ethernet-derived protocols having connection-oriented characteristics have been recently developed. Connection-oriented Ethernet protocols send Ethernet traffic frames over predetermined paths and are suitable for longer distance communication as well as short distance communication. As historically Ethernet networks were relatively localised in geographic extent, in order to send traffic over longer distances, a number of different network domains may be encountered.

In order to send traffic along a path which utilises the communications links of another network domain, a carrier service over that network is used. This requires a suitable point of interconnection between the networks and the carrier and client need to agree the service characteristics for sending client traffic over the carrier network domain.

The relatively large size of the Ethernet frame header compared to rival technologies means that bandwidth is used less efficiently when Ethernet carrier services are provided compared to Multi-Protocol Label Switching (MPLS) for short length client payloads. Short length payloads include, for example, the payloads typically associated with voice communications packets, for example, Voice over Internet Protocol (VoIP). As the size of the Ethernet header is larger than such small payloads they are generally, using current methods, not efficiently carried by Ethernet as a result. The problem of bandwidth inefficiency is increased when the client traffic comprises Ethernet frames which each carry a small payload and which then need to utilise one or more Ethernet carrier networks. As each carrier Ethernet network will require its own Ethernet header to be appended, this increases the amount of additional header information to be sent over the network compared to the original payload.

Header compression schemes in one form or another are already known in the art. However, these operate on timescales which are not suitable for adaptation to Ethernet traffic due to the very high speed communications links that Ethernet can utilize, now that Terabit communication speeds are available. For example, relatively slow speed header compression schemes are known in the art for TCP header compression (for example, as described in the Internet Engineering Task Force (IETF) Request For Comments (RFC) 1144 entitled "Compressing TCP/IP Headers for Low-Speed Serial Links") and for Real Time Protocol (RTP) header compression.

These schemes compress the traffic headers at the transport layer and above, i.e., at layers in the Open Systems Interconnection (OSI) communications stack above the Ethernet link level (layer 2) of the communications protocol stack. For example, the TCP header compression scheme described in RFC 1144 is used to compress packet IP and TCP headers. RTP header compression is also known to compress a combination of IP, UDP, and RTP headers on a link-by-link basis and is described IETF RFC 2508. Moreover, the TCP and RTP header compression at layer 3 and higher layers in the OSI hierarchy is performed by routers before sending packets to layer 2 switches, which means that header compression must be performed on a link-by-link basis. This increases the delay caused by the compression scheme as each time the compressed traffic is received by another layer 3 node, it must be decompressed unless that node is able to determine all necessary routing information. As a result, to perform such a scheme across multiple routers, the routers would need to have the full layer-3 header information to route the packets, i.e., all nodes along the path of the compressed headers would need to be able to support the compression scheme implemented. Moreover, known TCP and RTP compression schemes are based on shared context information between the compressor and the decompressor and other information such as first-order difference and delta encodings for some fields.

Header compression techniques for MPLS are also known in the art and are described in the Request For Comments documents RFCs 4247 and 4901 circulated by the Internet Engineering Task Force. However known MPLS compression schemes utilise layer 3 or higher compression techniques which actually compress the RTP/UDP/IP headers which are then carried using MPLS traffic units and the MPLS headers retain their standard structure. In other words, in MPLS the traffic units contain traffic which has already been compressed at layer 3 or above, the actual MPLS headers themselves are not compressed.

Open Systems Interconnection Layer 2 communications protocols (Data-Link protocols) such as Ethernet and MPLS operate by forwarding traffic from one node to the next node. Each node thus performs a forwarding operation on a received data protocol (or equivalently traffic) unit which requires address information to be extracted from the header of the data-link layer traffic unit in order to determine the next node the received traffic unit should be forwarded to. Known compression schemes operating at the data-link layer accordingly require the compressed state of a communications traffic unit to be identifiable by all nodes in the carrier network. However, making the compression key detectable within the carrier network imposes an inherent security risk as this provides a potential means of identifying the traffic flow within the carrier network. This makes the traffic flow more vulnerable to detection and/or interception and also enables information such as the path taken by the traffic containing a detectable compression key to be tracked within the carrier network, for example, by hackers etc.

SUMMARY OF THE INVENTION

Embodiments of the present invention seek to obviate and/or mitigate the above problems associated with conventional compression schemes for layer 2 communication protocols which require traffic units having a compressed state (for example, the traffic units comprising one or more compression keys along with data which has been compressed) to be distinguished by each node in the network from other traffic units comprising non-compressed traffic and/or other traffic units including other compression keys within their payload areas.

The embodiments of the invention seek to improve the security of compressed traffic in data-link networks which conventionally require a data-link communications protocol traffic unit having a compressed state to be distinguished from other types of data-link communications protocol traffic by disguising the presence of a compression key. In one embodiment, the compression key is provided as a "dummy" data structure forming part or all of a communications protocol data unit. The "dummy" data structure is encapsulated and appears as an internal data structure of a carrier layer 2 traffic unit. The purpose of the "dummy" data structure, that it represents a compression key, is not distinguishable by most of the carrier network nodes from the same type of data structure serving its conventional purpose. For example, in one embodiment, a header having a large data volume is removed from a client traffic unit and replaced with a "dummy" header from a different communications protocol which has a lower data volume. The payload of the original client traffic unit and the appended "dummy" header are conveyed in the payload area of a carrier traffic unit. The "dummy header" is assigned one or more values in one or more of its header fields which represent one or more compression keys. As the "dummy" header has a lower data volume, it requires less bandwidth in the carrier network, compared to the size of the actual header it is replacing. The "dummy" header need not perform any function other than that of conveying a compression key in "disguised form". Only when the dummy header disguising the compression key is received by a certain type of node, referred to herein as a special edge node (SEN), arranged to recognise the disguised header in the carrier traffic unit, is the true purpose of the dummy header revealed. In one embodiment, the compression key consists of a "dummy" data structure which comprises both a header and payload area conforming to a communications protocol, and the original client information may be attached to the "dummy" data structure in any suitable manner apparent to one of ordinary skill in the art.

A traffic unit (for example, a packet or frame) has a compressed state if it comprises compressed data. Compressed data may comprise i) data from which a subset of data has been removed, for example, a subset of the data which is redundant and/or not used in the carrier network and/or ii) different replacement data which occupies a smaller data volume and replaces the original data having a larger data volume. The compressed or replacement data may comprise the header data of a traffic unit encapsulated within the carrier network traffic unit's payload area or it may comprise the header and additional data taken from the payload area of the encapsulated unit.

Embodiments of the invention are as set out by the accompanying claims, below and may be combined in any appropriate way obvious to those of ordinary skill in the art.

Some embodiments of the invention seeks to provide a data-link layer header compression scheme for a carrier network in which carrier traffic is forwarded on a node by node basis, for example, for an Ethernet carrier network which carries client Ethernet traffic. The scheme can be used for connection-less or connection-oriented versions of the Ethernet communications protocol, which is a layer two (data-link) protocol arranged to transmit a unit of data from one network node to another network node in the data-link network in such a way that the bits of a traffic unit received by one node are the same as the bits in a traffic unit sent to the next node. In one embodiment, the data-link compression scheme provides a means for conveying a client Ethernet traffic frame comprising a payload and media access control (MAC) header information over a carrier network. The header of the client Ethernet frame is removed and replaced with the header of another "dummy" Ethernet frame or a "dummy" header from another communications protocol, for example, with a "dummy" MPLS header. A compression key populates the header fields of the "dummy" header. The client payload and "dummy" header are then encapsulated within the carrier Ethernet frame which reduces the amount of bandwidth required in the Ethernet carrier network to carry the client Ethernet traffic. In this example, the carrier Ethernet frames would include an MPLS Ethertype value in their headers, and appear to have an MPLS payload within the carrier network. However, when a carrier Ethernet frame is received by a special edge node in the carrier network, the Ethertype value would trigger processing of the carrier payload contents, and the "dummy" MPLS header would be revealed as a compression key which would be used to retrieve the original Ethernet client header information. The client Ethernet frame could then be regenerated and forwarded on to its destination.

However, in the case where more than one carrier network may be used by client traffic, a handover operation is needed to be performed by the special edge nodes to transfer the compression key information from one carrier network to the next, or to regenerate new compression key information.

One embodiment of the invention seeks to provide a method of reducing the bandwidth required to send a plurality of client traffic frames over a plurality of carrier communications networks, each carrier network being arranged to provide a carrier service to the client traffic frames, each client frame comprising client header information and client payload, the method comprising at an ingress node of a second carrier network:

receiving a frame of traffic from a first carrier network;
    determining first compression information is present in the frame which has replaced redundant header information not used for forwarding the frames in the first carrier network;
    generating second compression information to replace the header information used for forwarding the frames in the first carrier network;
    replacing the header information used to forward client payloads in the first carrier network with the second compression information; and
    appending header information to the client payload to enable forwarding of the received frame of traffic in the second carrier network,
    wherein the second compression information is stored in association one or more of the following:
    the replaced first header information;
    the first compression information; and/or
    the client header information replaced by said first compression information.

In one embodiment, the method further comprises at an egress node of the second carrier network:
    processing each received traffic frame to extract the second compression information from each received traffic frame;
    using the extracted second compression information to perform a look-up operation which retrieves information enabling the client frame to be restored.

In one embodiment, the method further comprises at an egress node of the second carrier network:

processing each received traffic frame to extract the second compression information from each received traffic frame;

using the extracted second compression information to perform a look-up operation which retrieves header information from the data store enabling the frame received from the first carrier network to be restored.

In one embodiment, the second compression information is associated with the first compression information in the data store and the look-up operation comprises:

retrieving the first compression information key using the second compression information key; and retrieving the client header information using the first compression key.

In one embodiment, the first header compression key is used to replace the same redundant header information for all the traffic having the same set of header characteristics.

In one embodiment, the set of header characteristics comprises at least one or more header fields taken from a group including one or more of the following:

a header field which uniquely identifies a source address of the client traffic; and/or a header field which uniquely identifies a destination address of the client traffic; and/or a header field which uniquely identifies a virtual local area network identifier of the client traffic; and/or a service session identifier for the client traffic.

In one embodiment, the second compression information is sent to the data store accessible by the egress node of the second carrier network by the ingress node to the second carrier network carrier network over a network management/control network for the second carrier network.

In one embodiment, at least some of the client traffic received by the ingress node conforms to a connection-less Ethernet protocol.

In one embodiment, at least some of the client traffic received by the ingress node conforms to a connection-oriented Ethernet protocol.

In one embodiment, the first and second carrier traffic conforms to a connection-oriented Ethernet protocol.

In one embodiment, the client traffic comprises Ethernet traffic and the first and/or second compression information conforms to the data format of one or more standard multi-protocol label switching (MPLS) standard communications protocol label data values.

In one embodiment, the second compression information is placed in the client payload prior to the second carrier header information being appended to the client payload.

In one embodiment, the second compression information is placed in a field of the second carrier header.

In one embodiment, the second compression key is used for each frame of traffic in the same traffic flow.

In one embodiment, the second carrier frame comprises a connection-oriented Ethernet frame including an Ethertype value which indicates the second carrier frame payload includes the first and second compression information.

Another embodiment of the invention seeks to provide a communications system comprising a client communications network and at least a first and second carrier networks, said second carrier network comprising means collectively arranged to implement steps in the method aspect.

Another aspect of the invention seeks to provide a communications node for use in a communications system aspect, the node comprising one or more components arranged to:

process the received traffic to remove the appended header information and restore the replaced header information by removing compression information; and use the removed compression information to perform a look-up operation on the data store.

Another embodiment of the invention seeks to provide a data store comprising compression information, the data store being arranged for use by an egress node in the communications system embodiment, wherein the data store comprises a plurality of data records in which the second compression information is stored in association one or more of the following:

the replaced first header information;

the first compression information; and/or the client header information replaced by said first compression information.

Another embodiment of the invention seeks to provide a boundary node arranged to transfer client traffic between a first carrier communications network and a second carrier communications network, wherein a carrier communications traffic unit comprises compressed data and a compression key, both being derived from a client traffic unit, wherein the compression key is arranged to enable the client traffic unit to be restored from the compressed data and is transported in the carrier traffic unit as one or more values within a header component of a traffic unit conforming to a communications protocol having a smaller data volume than the equivalent header component of the client traffic unit, the node comprising:

means for receiving the carrier traffic unit;

means for processing the carrier traffic unit at the boundary node to extract from the header component first compression key data;

means for mapping the extracted first compression key data to second compression key data;

means for replacing the first compression key with the second compression key in the header component; and means for sending the carrier traffic unit with second compression key over the second carrier network to a special edge node of the second carrier network.

Some embodiments of the invention accordingly seek to provide a header compression scheme to mitigate and/or obviate the bandwidth inefficiency associated with the use of carrier Ethernet for relatively small payloads, i.e., for payloads whose bandwidth requirements are less than or of the same order as the Ethernet frame header, including VoIP traffic.

An embodiment of the invention seeks to provide a header compression scheme for a layer two carrier technology such as Ethernet (especially connection-oriented or connection-less versions of the Ethernet communications protocols which support the separation of the Ethernet service layer from the underlying network layer such as that provided by Provider Backbone Bridging (PBB), PBB Traffic Engineering (PBB-TE or Shortest Path Bridging with PBB)).

Embodiments of the invention thus seek to provide a compression key which is provided as a data structure associated with a communications protocol. The "dummy" data structure functions as a redundant data structure in the sense that it comprises data presenting compression key information instead of data associated with the communications protocol the data structure appears to conform to.

The data structure is preferably clearly detectable by all nodes in the network, although only some nodes, referred to herein as "special edge nodes" or SENs, are capable of determining the true purpose of the data structure. For example, in one embodiment, a header comprising an arrangement of header fields provides a "dummy data structure" which is used to disguise the presence of one or more compression keys. In this way, the compression key is concealed from the internal nodes of the carrier network as it appears to those nodes as a data structure associated with a communications protocol. For example, the dummy data structure may comprise an encapsulated traffic unit header (and/or may also include the payload area of the encapsulated traffic unit). In this way, a compression key can be carried within a so-called "dummy" header which has replaced the original header of the client traffic conveyed by the carrier traffic unit. As traffic including a compression key according to the invention is not identifiable by the internal carrier nodes in a carrier network (or by "ordinary" edge nodes even) as traffic including a compression key, the traffic including the compression key is not distinguishable from traffic which comprises normal (i.e. non-compressed) traffic—the traffic simply appears to be normal traffic carrying a particular type of payload traffic.

Preferably, the data structure comprises a dummy header associated with a different communications protocol to the protocol associated with the client data and replaces the header of the client data. The dummy header does not serve any routing purpose but preferably has a form which takes up less data volume than the header it is replacing.

In one embodiment of the invention, the carrier network is a carrier Ethernet network and at a special edge node (SEN) which receives a client traffic unit, the client traffic is compressed by having its header removed and instead a header having a smaller data volume is appended to the client traffic payload. For example, an MPLS header may be used to replace the original headers and be appended to the payloads of ATM packets or to other Ethernet packets or even to MPLS packets.

The SEN then writes into one or more of the header fields of the "dummy" MPLS header one or more compression key values for that client traffic flow. The dummy MPLS packet is then encapsulated within the carrier network Ethernet frame, whose Ethertype is set to the values corresponding to MPLS. The Ethernet frame carrying the MPLS packet is then routed across the carrier network and to all nodes which are not SENs the Ethernet frame appears to be carrying normal MPLS traffic. However, when received by an SEN packet, the MPLS Ethertype and/or the header field values are recognized as indicating that instead the traffic within the Ethernet frame is compressed (and may require decompression). The original header data can then be recovered by performing a look up operation based on the values extracted from the dummy header fields and by reappending this to the client data the client data is restored to an uncompressed state. If the client data, is then to be recompressed to travel over another carrier network, the SENs of one network can simply map the values hidden in the dummy header fields across to values recognized by the SENs of the other carrier network.

Thus in some embodiments of the invention, the header contents of an MPLS packet are provided with data values by a SEN which represent a compression key. In this way, while appearing to be an "ordinary" MPLS header which is indicated in a conventional way by the payload type indicator in the header of the carrier traffic unit, when the carrier traffic unit is received by a special edge node in the carrier network, the normal processing of the carrier traffic unit by the edge node is interrupted as the header values and/or the type of header value present in the header field of the carrier traffic unit instead trigger special processing as the edge node recognises the header values are not to be used for routing purposes but are instead representing one or more compression keys. In one embodiment, the recognition is achieved by the normal forwarding address look-up operation which the SEN performs using information extracted from the encapsulated header returning a triggering value which identifies that the traffic unit carries compressed data. In addition or alternatively, the lookup operation may use the same or another compression key to retrieve the data which the header has replaced to restore the client traffic.

In one embodiment of the invention, the compressed client traffic may have its header removed and then be encapsulated within the payload of a "dummy" traffic unit data structure which is then encapsulated within the carrier traffic unit. Alternatively, the compressed client traffic may be appended or concatenated to the intermediate traffic unit data structure. In either case, the presence of the intermediate traffic unit serves solely as a data structure which can be used to convey a compression key or other indicator of a compression state.

For example, if an MPLS packet is used as an intermediate traffic unit data structure in a carrier Ethernet traffic unit, the Ethernet traffic unit will contain an MPLS Ethertype. However, at the SEN, only a look up process is performed on the MPLS header values—no processing of the MPLS payload is performed as the MPLS header serves only to provide information which when extracted by the special edge node indicates that the Ethernet carrier frame contains compressed contents. The actual client traffic may be Ethernet or in fact, may comprise another form of client traffic.

In one embodiment of the invention, the presence of a particular Ethertype may be sufficient to indicate a compression state. In this embodiment, when a carrier Ethernet frame is received by a special edge node (SEN), the SEN regards any frame with the MPLS Ethertype as a frame carrying instead a compression key and not carrying MPLS traffic and performs a special look-up operation to retrieve the data required to decompress the compressed contents of the carrier frame. However, to all other nodes in the network, the carrier Ethernet frame is simply a normal frame carrying MPLS traffic as the format of the compression key is contained within the format of the MPLS traffic.

In either case, whether indicated by a particular type of Ethertype and/or particular value(s) in the header/payload area of an intermediate data structure, all that is visible within the network is the presence of the intermediate data structure. As a result, if a hacker snoops on the carrier traffic in transit, they will just see Ethernet carrying the intermediate data traffic, e.g. Ethernet carrying MPLS traffic as opposed to Ethernet carrying a compression key. As a result, the compression key, while "hidden" is also in "plain view".

In addition, it is possible, as the MPLS header is never used for MPLS routing (as it is always encapsulated within another carrier network traffic unit), for one or more or all fields of the MPLS header to be used for the compression key.

BRIEF DESCRIPTION OF THE DRAWINGS

Preferred embodiments of the invention will now be described with reference to the accompanying drawings, which are by way of example only, and in which:

FIG. 9A shows a local compression information storage architecture according to an embodiment of the invention;

FIG. 9B shows a centralised compression information storage architecture according to another embodiment of the invention;

DETAILED DESCRIPTION

Embodiments of the invention will now be described. Those of ordinary skill in the art will be aware that the description of the invention has been simplified for clarity. Where features are apparent and already known to those of ordinary skill in the art as essential for the implementation of the invention these may be omitted from the description for brevity. The description may also omit to mention alternative features which are functionally equivalent to the features recited herein where these are well known in the art.

Figure 1:
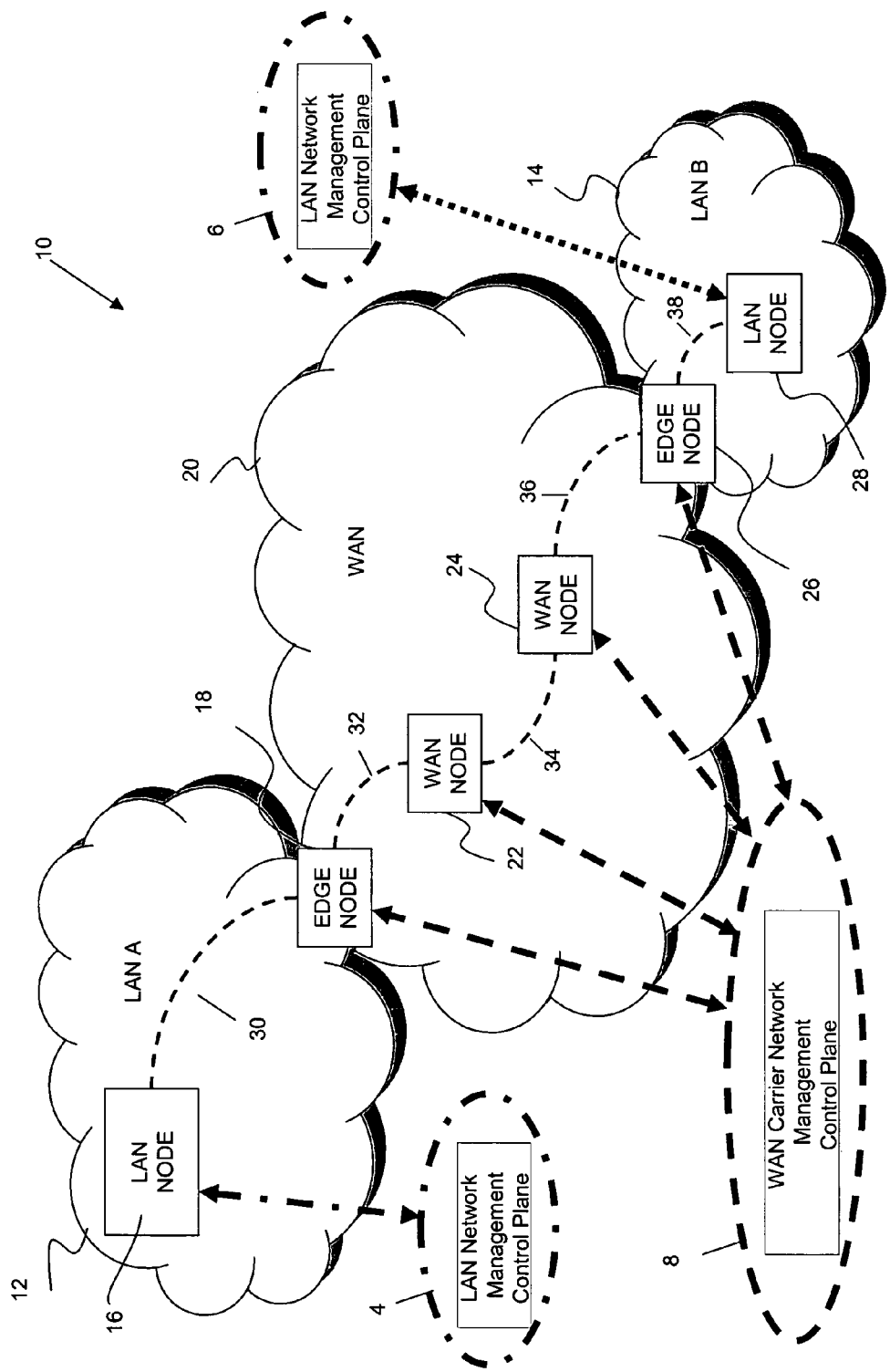
FIG. 1 shows a communications system in which a header compression scheme can be implemented according to an embodiment of the invention.

A communications system 10 according to an embodiment of the invention is shown in FIG. 1 as comprising a first network 12 (shown as LAN A, a second network 20 (shown as WAN) and a third network 14 (shown as LAN B). As those of ordinary skill in the art will realize, however, the geographic extent of each network can be different in other embodiments of the invention.

As shown in FIG. 1, LANs A and B provide a carrier service for client traffic, and WAN 20 provides a carrier service for traffic between LANs A and B. In a preferred embodiment of the invention both LANs A and B and WAN 20 are layer 2 data-link networks, for example, Ethernet networks, in which traffic is forwarded on a node by node basis. Those of ordinary skill in the art will find apparent that each network may comprise many more nodes than those shown in FIG. 1.

It is possible to encapsulate a client Media Access Control (MAC) header information either inside a carrier MAC header using the compression scheme or to encapsulate the MAC header information within the payload of the carrier Ethernet frame.

One embodiment of the invention maps one MAC header inside another. However, in an alternative embodiment the client MAC header is mapped inside the payload of the carrier fram. The data-link communications protocol used to convey the MAC header information is exemplified below and in the description with reference to Ethernet, which could be connection-less or connection-oriented. In one embodiment the compression scheme is implemented using Provider Backbone Bridging (PBB) or Provider Backbone Bridging with shortest path bridging, both of which are connectionless, as the carrier network protocol. Alternatively, the carrier network protocol could be connection oriented such as PBB-TE (PBB with Transport Engineering or PBT (Provider Backbone Transport). The invention may be adapted to be utilized by other connectionless or connection oriented layer 2 data-link communications protocol networks.

The following embodiment uses a connection-oriented communications protocol in which connections are established by the network management/control plane for the forwarding nodes in the carrier network. The header compression schemes in these embodiments are capable of being set up for any source of traffic which has header information characterizable in the client network for all the traffic frames of that traffic source which are to follow a predetermined path determined by the network management/control plane, for example, a traffic flow and/or service session.

In the embodiment shown in FIG. 1, the second network 20 provides a connection-oriented carrier service to connection-oriented traffic received from first network 12. The connection-oriented protocol comprises, for example, a connection-oriented Ethernet communications protocol such as PBB-TE.

Within the first network 12, traffic is routed along predetermined paths determined by the network management/control plane 4 for the first network if the LAN is connection-oriented. If alternatively, the LAN behavior is connectionless then the MAC-in-MAC encapsulation/decapsulation will occur at the edges of the carrier network WAN 20 and normal Ethernet bridging will apply not management. The paths are determined by the network management/control plane 4 configuring the forwarding tables used by the nodes 16, 18 in the first network 12. Within the second network 20, the network management/control plane 8 will configure the forwarding table of nodes 18, 22, 24, 26 in the second network 20. In the third network 12, the network management/control plane 6 will configure the forwarding tables used by nodes 26 and 28 to forward traffic along predetermined paths.

If LAN 12 supports a connection-less Ethernet protocol instead, then the header compression scheme will be implemented only at the edge of WAN 20, in which case normal Ethernet bridging would apply, not network management, to configure the path through the LAN 12. In this case, one embodiment of the header compression scheme would implement MAC-in-MAC encapsulation/decapsulation at the edges of the WAN 20.

The path that a traffic frame follows is determined when a node receiving the traffic frame processes the header of that frame to extract one or more header field values which are then used to perform a look-up operation on the forwarding table of that node. The look-up operation determines the next node that is to receive that particular traffic frame.

In FIG. 1, a path is shown in which a communications traffic flow is sent along communications link 30 from node 16 in first network 12 to the boundary node 18 between the first and second networks. Within the second network 20, the traffic flow is along communications link 32 to node 22, then along communications link 34 to node 24, and finally along communications link 36 to node 26 at the boundary with third network 14. Traffic then flows from edge node 26 to node 28 along communications link 38 within third network 14.

Figure 2:
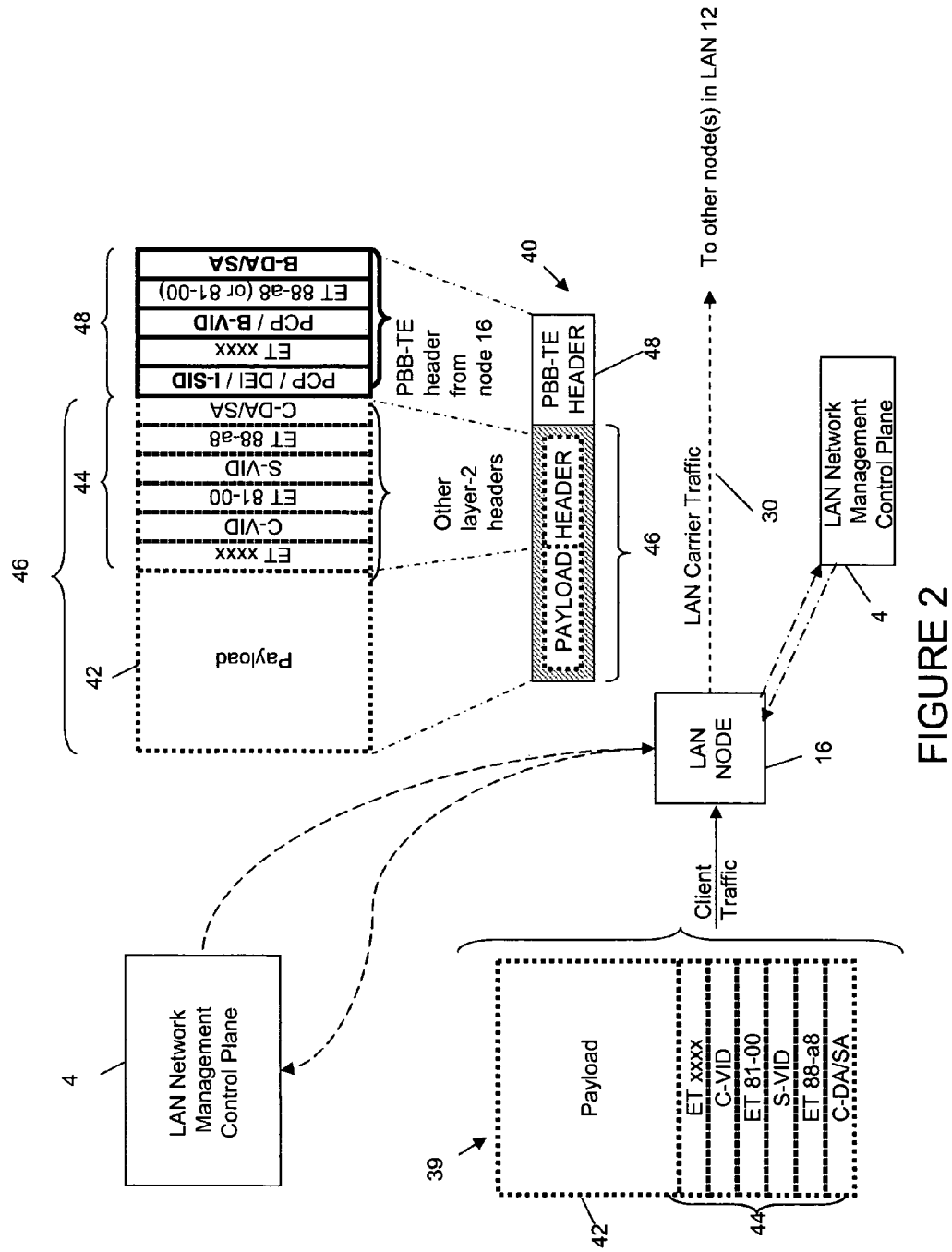
FIG. 2 shows schematically header generation at a first ingress node.

FIG. 2 of the accompanying drawings shows an embodiment of the invention in which the first network 12 provides a connection-oriented Ethernet carrier service to Ethernet client traffic. As shown in FIG. 2, the connection-oriented Ethernet carrier service is implemented using Ethernet frames which conform to the PBB-TE communications protocol. In FIG. 2, node 16 receives a client traffic frame 39 comprising a payload 42 and a header 44. The node processes the header 44 to extract relevant routing information for the purposes of establishing a path across network 12 and then encapsulates the entire client traffic frame 39 including the payload 42 and header 44 in the payload 46 of carrier frame 40. This is possible as the client header 44 is effectively redundant in network 12 as it does not need to be processed by any other nodes in network 12 for forwarding the carrier frame.

The path taken by the frame 40 across network 12 is determined by the network management plane 4 of the first network 12 in any suitable way known to those of ordinary skill in the art. Thus as shown in FIG. 2, the traffic frame 40 will be forwarded via communications link 30 to the next node along the predetermined path which will be determined using the forwarding table of node 16.

In the embodiment shown in FIG. 2, the network management/control plane determines a route for the client traffic frame on a per traffic flow and/or per service session basis. Each frame of traffic which belongs to the same traffic flow and/or service session has one or more header field values which are the same. Thus the look-up operation performed by a node receiving each frame using the same header field values will locate the same node for forwarding the received traffic frame on to, in their forwarding table. In this way, traffic frames in the same traffic flow and/or service session will follow the same predetermined path.

The look-up operation is based on certain header fields of the received Ethernet traffic frames (for example, such as a Media Access Control (MAC) source address (SA), a MAC destination address (DA), and virtual-LAN (VLAN) identifier tuple). FIG. 2 shows schematically the type of header information generated at the node 16 for a PBB-TE carrier service which maps the client frame 39 to the payload 46 and appends header 48 comprising a plurality of header fields including: a Priority Code Point (PCP), Drop Eligibility Indicator (DEI), I-SID (Service Instance Identifier) header field, an Ethertype field for the client traffic (ET xxxx), a Priority Code Point (PCP)/Backbone VLAN identifier (B-VID) field, another Ethertype field (ET 88-a8 or 81-00), and finally a backbone destination address/source address field (B-DA/SA). In embodiments of the invention which utilize other connection-oriented or connection-less Ethernet protocols for the carrier service in the first network, different header information may be generated, for example the S-VID or service provider VLAN identifier or the connectionless variant(s). Obviously, if LAN 12 provides a connection-less service, then the header fields would be those associated with the connection-less Ethernet protocol (for example PBB (without TE) or Shortest Path Bridging with PBB).

As shown in FIG. 1, the PBB-TE frame 40 is forwarded to node 18 which forms the boundary between the network domain of the first network 12 and the network domain of the second network 20. However, in order to send the client traffic frame 39 over the second network 20, the traffic in the first network 12 utilizes the second network 20 as a carrier network.

Figure 3A:
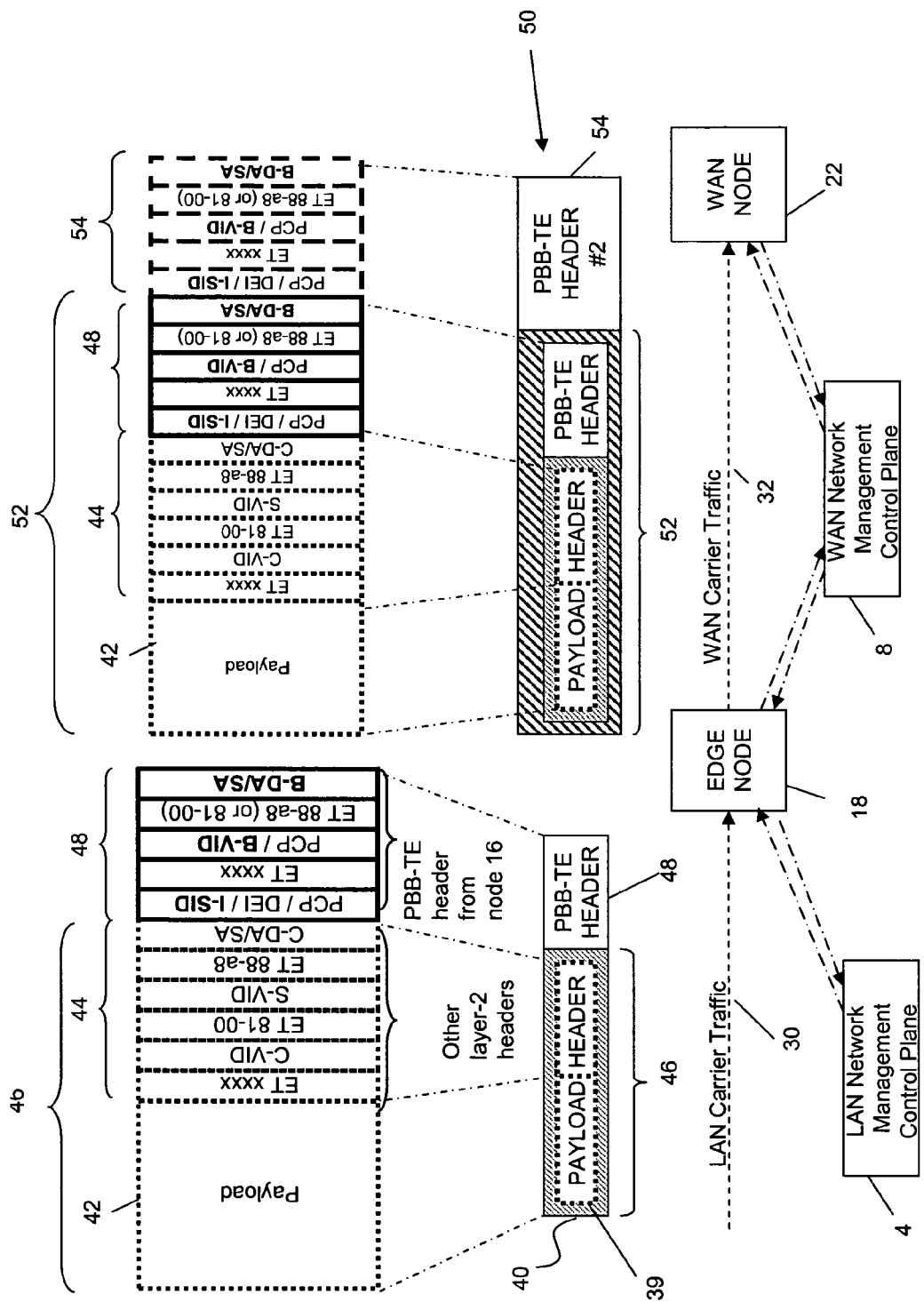
FIG. 3A shows the header generation at a second ingress node without implementing a header compression scheme according to the invention.
Figure 3B:
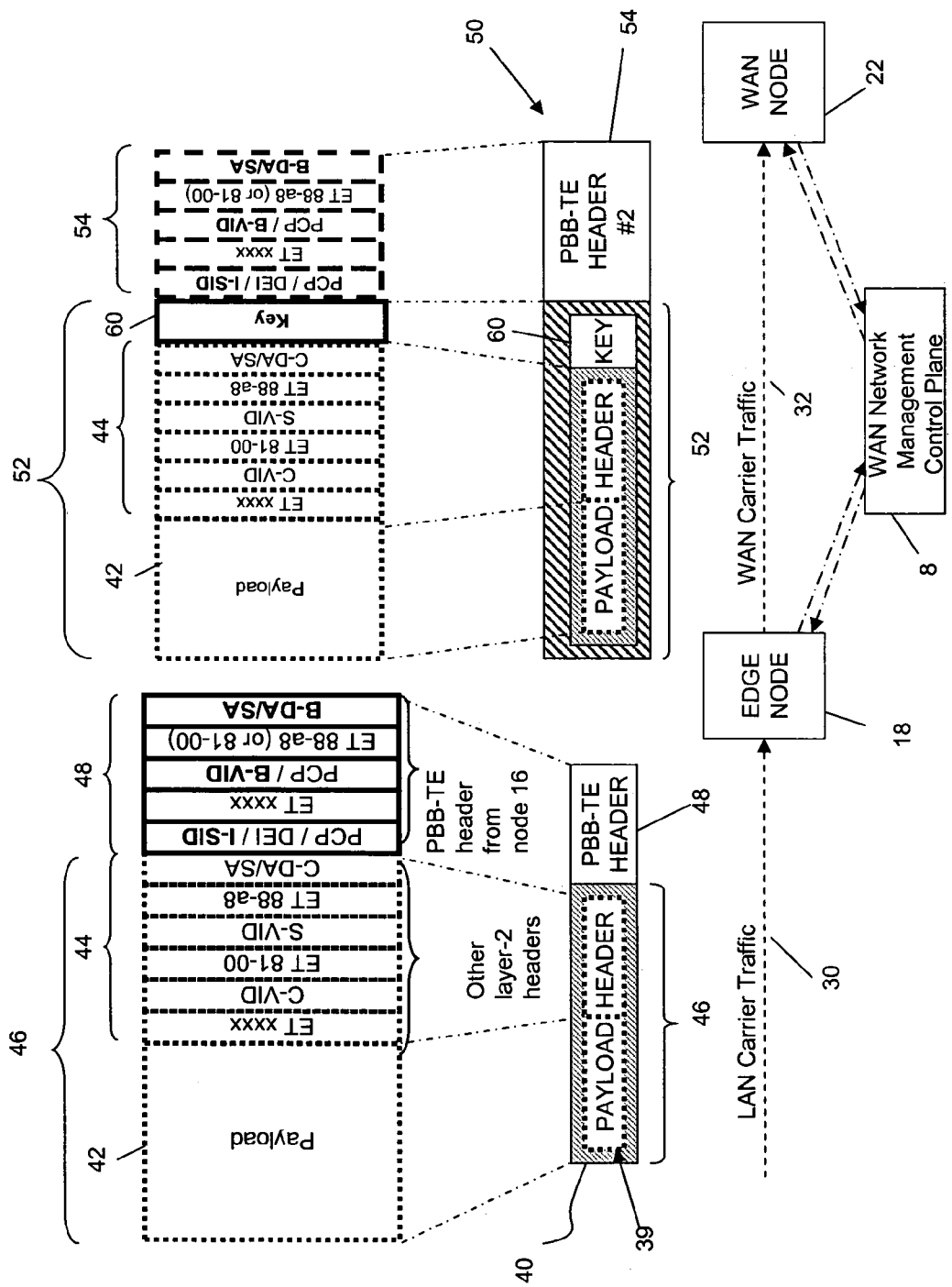
FIG. 3B shows the header generation at a second ingress node with a header compression scheme according to an embodiment of the invention.

FIG. 3A shows how the second network 20 provides a carrier service to first network 12 in the absence of a header compression scheme according to the invention, whereas FIG. 3B shows schematically how a carrier service is provided which uses a header compression scheme according to an embodiment of the invention. The term "client" will refer to the first network 12 in the following description of FIG. 3A and the term "carrier" to the second network 20.

In FIG. 3A, client traffic frame 40 is mapped from a form conforming with a communications protocol supported within first communications network 12 into a form which conforms with a communications protocol supported within the second network 20. The mapping is performed by the node 18 which lies at the boundary between the first and second networks. In FIG. 3A, at the node 18, the client frame 40 is encapsulated within carrier payload area 52 and an additional carrier header 54 is appended to form a carrier frame 50. Carrier header 54 comprises various header fields associated with the carrier service which are used to forward the carrier frame 650 across the second network 20 according to the forwarding information provided to each node along the path for the carrier frame.

When node 26 at the boundary between the second and third networks receives carrier frame 50, it will process the header 54 and determine that the traffic is to be forwarded via a node in the third network 14. Accordingly, at node 26 the carrier header 54 is removed and the carrier payload 52 is processed to de-encapsulate the client frame 40. The client frame 40 can then be forwarded on node 28 within third network 14 either using the de-encapsulated header 48 (if forwarding based on the header fields of header 48 is supported in the third network 14) or by re-encapsulating the header in the payload of another carrier service frame which is supported by the third network 14.

Conventionally, when a carrier network provides a carrier service for Ethernet client traffic, the Ethernet frame header fields 28 used for forwarding purposes in the first network 12 are retained fully in the payload 52 of the carrier frame 50. Accordingly, if the client traffic is PBB-TE for example, and the carrier network service provided is also implemented using the PBB-TE communications protocol, the provision of a PBB-TE carrier service for a PBB-TE client network will result in two PBB-TE headers being conveyed in the carrier network 20. However, only those fields in the outer PBB-TE header 54 associated with the carrier Ethernet frame 50 are used within the carrier network 20 to forward the carrier frame 50.

A conventional PBB-TE header consists of a 6 byte DA, 6 byte SA, 2 byte Ethertype, 2 byte B-tag, 2 byte Ethertype, and 4 byte I-tag. The transmission efficiency can be determined in a simple example by treating a standard IEEE 802.3 Ethernet frame as the payload of the carrier service. Such an Ethernet frame has a minimum payload of 46 bytes so the complete frame (with additional 18 bytes of header+FCS) has minimum size of 64 bytes.

This means that if the original client payload 42 has smaller or comparable bandwidth requirements to each of the two carrier headers, for example, if the client payload 42 is generated by packetizing voice traffic (e.g. VoIP), the bandwidth required just to send the Ethernet header information makes the use of carrier Ethernet services very bandwidth inefficient. For example, consider when a carrier frame 50 in first network 12 is used to convey voice client traffic. An estimate of the bandwidth for a G.729 call which has an 8 Kbps codec bit rate with an Ethernet header, when the client traffic has a compressed Real Time Protocol (cRTP) or other compressed layer three communications protocol such as Universal Datagram Protocol (UDP) or Internet Protocol (IP) header and a default 20 bytes of voice payload is given by: Total client traffic packet size (bytes)=(Ethernet header of 14 bytes)+ (compressed IP/UDP/RTP header of 2 bytes)+(voice payload of 20 bytes)+(Ethernet FCS of 4 bytes)=40 bytes, although in practice the Ethernet frame is padded to 64 bytes to meet the minimum Ethernet frame size requirement. Here the compressed IP/UDP/RTP refers to the header compression which has been implemented in a layer above the carrier Ethernet layer (here at layer 3 as Internet Protocol/Universal Datagram Protocol/Real Time Protocol header compression has been performed).

This would imply that when the client traffic payload 42 comprises 20 bytes of payload, 26 bytes of padding and 4 bytes of FCS, the client traffic header 44 comprises 16 bytes in total. If the first network 12 provides a PBB/PBB-TE carrier service, within network 12 it will use a 22 byte PBB/PBB-TE header 48 to carry a 64 byte payload 46 (we assume Ethernet frame 46 has no VLAN tags although FIG. 2 depicts the more general scenario with both C and S-VLAN tags). Providing a PBB/PBB-TE carrier service in second network 20 requires the PBB/PBB-TE carrier frame 50 in the second network 20 to have a 22 byte PBB/PBB-TE header 54 which now carries a 64+22=86 byte payload 52, resulting in a bandwidth efficiency of 64/(64+22+22)=59% for the traffic sent over the communications links 32,34, and 36 in the second network 20. If the traffic from second network 20 uses another carrier service in third network 14 which utilises PBB/PBB-TE, then another 22 bytes of header would be added in the third network resulting in an even lower bandwidth efficiency of 64/(64+22+22+22)=49% in the third network 14.

A header compression scheme according to the invention thus provides a MAC-in-MAC header compression scheme in which connection-less or connection-oriented MAC header information is encapsulated within the header (or payload) of another data-link layer communications protocol frame such as Ethernet, removing the need to send redundant client MAC information over a carrier network.

The embodiment described with reference to FIG. 3B below describes what can be referred to as a MAC-in-MAC-in-MAC compression scheme, but the invention works equally well just for MAC-in-MAC, in which case the LANs 12,14 shown in FIG. 1 would all support connectionless Ethernet with the MAC-in-MAC header compression scheme occurring just at the edges of WAN 20.

FIG. 3B shows a header compression scheme according to an embodiment of the invention in which the bandwidth efficiency is improved in a carrier network. The header compression scheme involves removing redundant header information 48 from the payload 52 of the carrier frames 50 within the carrier network 20 and instead replacing it with header compression information 60. The header compression information 60 is stored in association with the header information it has replaced at a data store accessible by at least one node along the predetermined path for that traffic frame. In this way, when a node receives the carrier frame including the compression information 60 and determines that the frame is to be de-encapsulated, it can use the compression information to retrieve the replaced header information from the data store.

The compression information 60 comprises data of a type suitable for use as a compression key to enable the original header information 48 to be recovered from a data store, for example, a compression key table.

In one embodiment, the compression key is disguised as a "dummy" header of a communications protocol, for example, as the "dummy" header of an Ethernet frame or MPLS packet. Either the original header is removed and the "dummy" header is then appending to the remaining payload, or the original information from the original header is removed and replaced by the compression key, which effectively renders the original header as a "dummy" header.

The compression key is thus provided by one or more data values which are written into one or more or all fields of the "dummy" header. In this way, not only is the presence of the compression key disguised, but also, if the "dummy" header has the data structure of a different communications protocol to that of the original payload, so the original communications protocol of the original payload is also disguised. The "dummy" header in one embodiment consists just of the compression key information. In another embodiment, the compression key information may be represented by a different type of "dummy" data structure, i.e., be represented not just by the "dummy" header but also by part of the "dummy" payload. In one embodiment, the entire "dummy" data structure consists of the "compression key" having a form appropriately formatted to conform with the data structure required by a particular communications protocol.

In one embodiment, a compression key is used having a similar format to that used to indicate a label in a MPLS communications protocol. The compression information 60 can be placed in the payload 52 of the carrier frame 50 as shown in FIG. 3B, or elsewhere in the carrier frame, either at another payload location or, for example, written to a suitable header field or a header extension field of the carrier frame 50.

The node 18 which implements a compression scheme according to an embodiment of the invention uses the same compression information 60 to replace all frames of client traffic which have the same redundant header information in the carrier network. This reduces the amount of processing that is to be performed to generate the compression information as compression information needs to be unique on a per traffic flow and/or per service session and not per traffic frame.

Key Generation

The provision of compression information to one or more compression information data stores accessible by nodes in the carrier network 20 is performed by the network management/control plane 8 of the carrier network 20.

The generation of the compression information in one embodiment of the invention is associated with the initial configuration of a predetermined path by the network management/control plane 4 of the first network 12 for client traffic in accordance with whatever connection-oriented communications protocol the first network 12 supports. This determines that a carrier network 20 needs to be utilized and the process of signalling the path requirements to the network management/control plane 8 of the carrier network 20 also causes the network management/control plane 8 of the carrier network to set up compression information for the particular client traffic that is to follow that path so that this information is available when each client traffic frame 50 reaches the ingress node 18 to the carrier network 20. Alternatively, the compression information can be generated by the carrier network management/control plane 8 when a client traffic frame requiring compression is received by an ingress node 18 to the carrier network 20.

The compression information 60 is used to replace redundant header information for all frames associated with a particular traffic flow and/or it can be used to replace header information for all frames associated with a particular service session flow. In the latter case, the compression information can be generated when a new service instance is requested from the network management/control plane of the client network which will generate a session flow. In this case all frames associated with the same session flow will then have their redundant header information replaced by the same compression information 60 in the carrier network 20.

Figure 4A:
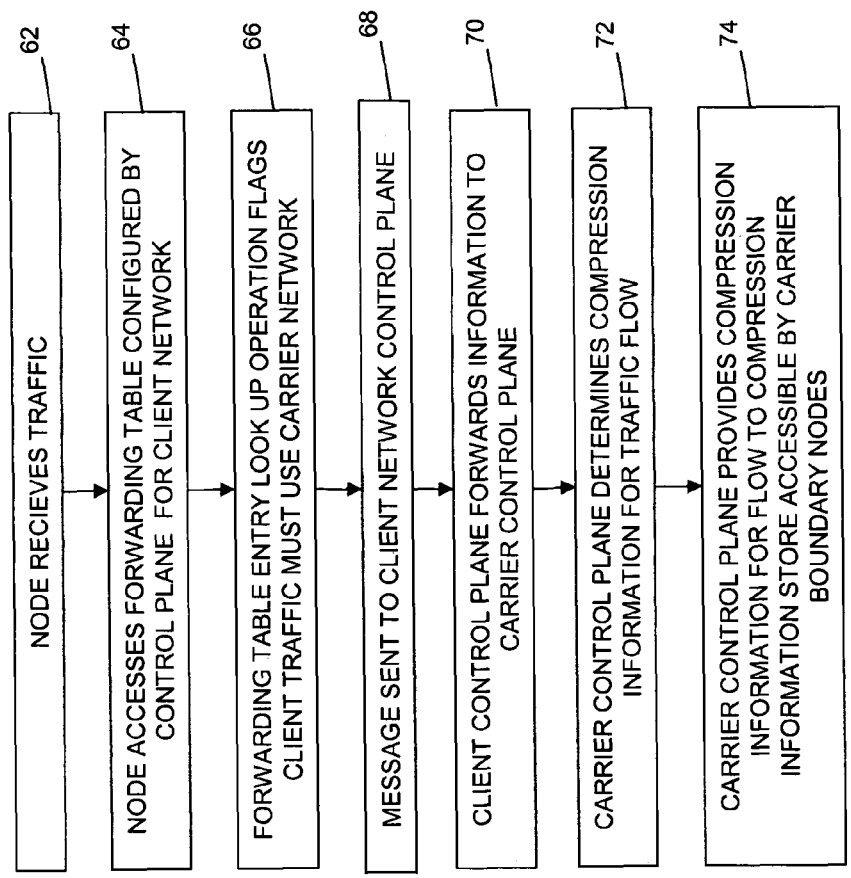
FIG. 4A shows a method of generating compression information based on traffic flow according to an embodiment of the invention.

FIG. 4A shows in more detail an exemplary method of generating compression information for a traffic flow according to an embodiment of the invention. As those skilled in the art will appreciate, the individual steps shown in the method in FIG. 4A may be combined and/or reordered and/or replaced by an equivalent step in any apparent manner suitable.

In FIG. 4A, the node 16 in the first network 12 receives traffic frame 39 and encapsulates this within the payload of a connection-oriented Ethernet frame (step 62, see also, for example, FIG. 2 of the accompanying drawings). Node 16 then determines forwarding information for the frame by accessing the forwarding table (step 64) using a look-up operation.

The look-up operation uses one or more header field values for the received frame which identify the frame as belonging to a particular traffic flow, for example, all frames in the same traffic flow will carry at least the same MAC source address, MAC destination address, and will at least belong to the same Virtual LAN and so share the same VLAN identifier. The forwarding table look-up operation determines from the set of header field values the next node to forward the received frame to in that network which conforms to the path determined by network management/control plane 4 for that traffic flow to follow.

Thus the network management/control plane 4 of first network 12 configures all the forwarding tables of the nodes along the path so that all frames associated with the same traffic flow follow the same path to the boundary node 18 with the second network 20, which is to provide a carrier service and which implements a header compression scheme according to an embodiment of the invention.

Accordingly, in this embodiment of a header compression scheme, when the node 16 performs the look-up operation on the forwarding table for client frame 39, this flags to node 16 that that the route includes a carrier network 20 (step 66). The ingress node 16 sends an appropriate message to its network management/control plane 4 (step 68) which processes the message and signals the carrier network management/control plane 8 (step 70) with appropriate information to enable the carrier network management/control plane 8 to generate appropriate header compression information (step 72). The carrier network management/control plane 8 then provides the header compression information in the form of a suitable compression key to one or more compression information stores, for example, some persistent memory structure such as a data-base or look-up table, to ensure the compression information 60 is available and can be retrieved when the ingress node 18 along the predetermined route to the carrier network 20 receives the first network frame 50 and is required to replace header information 48 with the compression information 60 (step 74).

In one embodiment of the invention, the compression information 60 comprises compression key data which is written into the existing header data structure as described hereinabove to form a "dummy" header, alternatively, the compression information 60 may be provided in the form of a "dummy" data structure (e.g. a "dummy" header) conforming with a data format imposed by a different communications protocol.

The carrier network management/control plane 8 can also populate the compression information data store which will be used by an egress node 26 if it has determined a predetermined path for the traffic flow at this point.

Figure 4B:
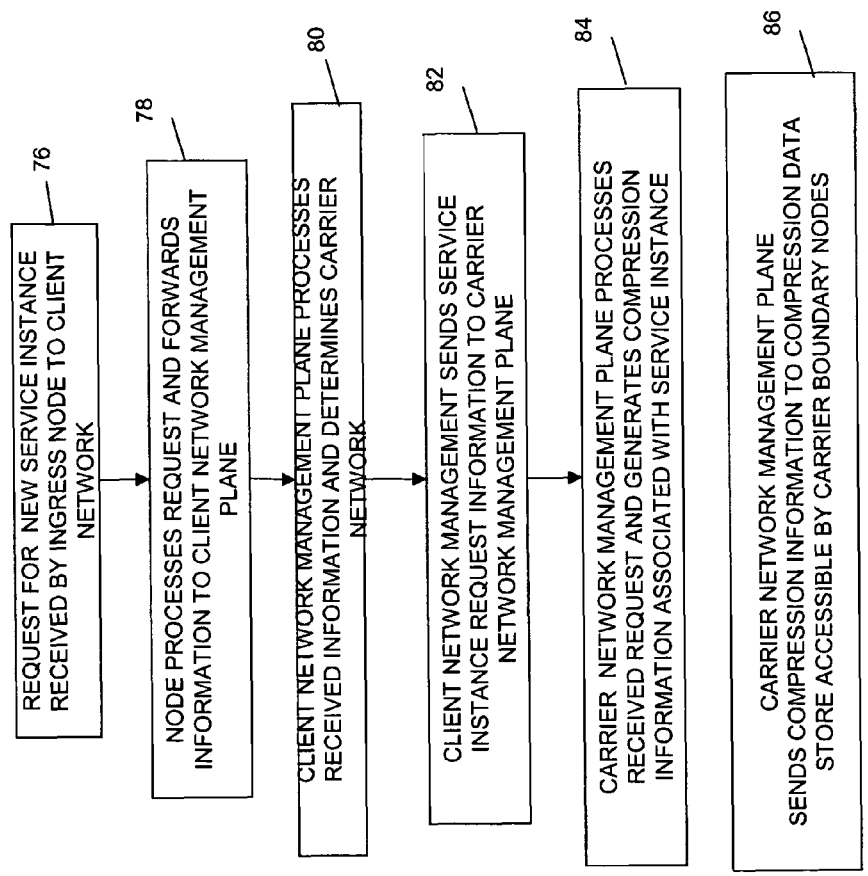
FIG. 4B shows steps in a method of generating compression information based on service instance according to another embodiment of the invention.

FIG. 4B shows an alternative key generation method in which a compression key is generated for all frames sharing the same service session (or service flow identifier). For example, the same compression key can be used for all frames with the same value in the Service Instance Identifier (SID) header field (for example, the I-SID header field when the connection-oriented Ethernet protocol is PBB-TE).

In FIG. 4B, a request for a new service instance is received by node 16 of first network 12 (step 76). Node 16 processes the request and forwards appropriate information including the SID header field information to network management/control plane 4 (step 78). The network management/control plane 4 processes the received service request and sets up appropriate forwarding table information as appropriate within first network 12 and determines that the traffic is to be routed over carrier network 20 to reach its destination (step 80) and sends a message to the network management/control plane 8 of the carrier network 20 (step 82) which includes information from the service instance request. The network management/control plane 8 of the carrier network 20 processes the service instance request information and generates compression information which is associated with the service instance request SID header field (step 84) and sends this to the appropriate compression information stores associated with the ingress/egress nodes of the carrier network 20 (step 86).

Figure 5:
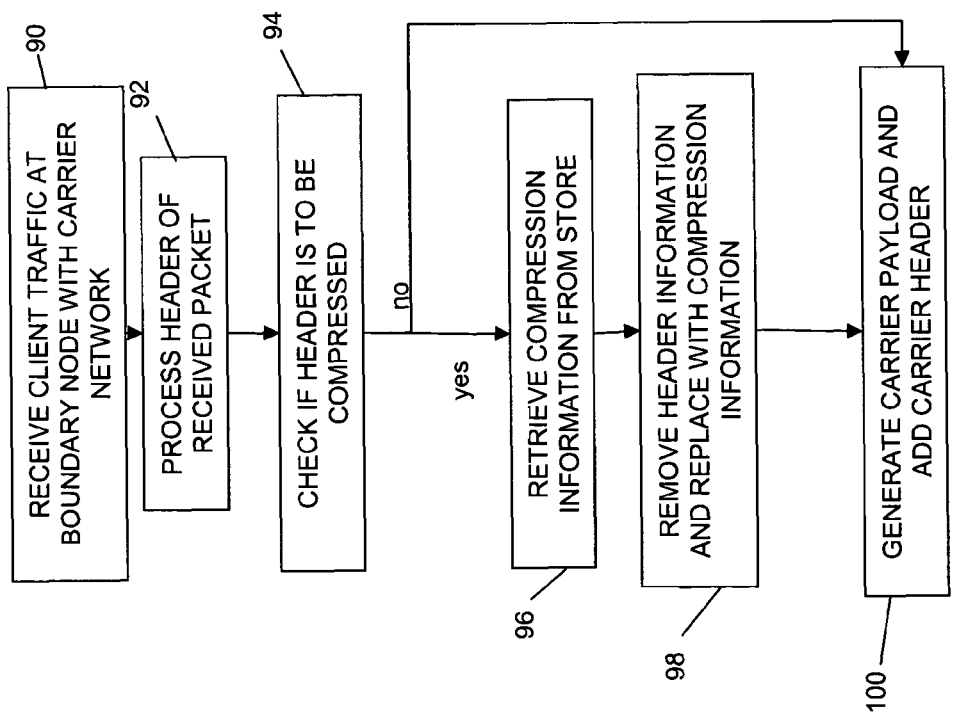
FIG. 5 shows how a second ingress node processes a received frame to implement a header compression scheme according to the embodiments shown in FIGS. 4A and 4B.

FIG. 5 shows steps in a header compression process which is performed by node 18 when providing a received traffic unit with ingress to the layer 2 carrier network 20 in which the compression scheme operates. For example, in one particular embodiment, in which node 18 is an ingress node 18 to a carrier Ethernet network 20 which implements a compression scheme according to the invention, FIG. 5 shows the process the ingress node 18 performs on a received Ethernet frame which is to use a header compression carrier service in the carrier Ethernet network 20.

When node 18 receives frame 40 (step 90) it processes its header 48 to perform a look up operation which determines that the traffic frame 40 is to be forwarded to a node 22 in carrier network 20 (step 92). A header compression scheme is either automatically implemented, or instead, header compression may be selective and performed only on selected frames. In the embodiment shown in FIG. 5, the node then determines if that particular frame is to be compressed (step 94) by checking if the forwarding table includes an indicator that the header frame is to be compressed, for example, by compressing everything associated with the same service instance. This means that for a session the compression indicator is based on one or more header indications.

If no compression indicator is determined to be present in the forwarding table in step 94, then the frame is then processed conventionally, for example in the manner shown in FIG. 3A where no header compression takes place, and the received frame is mapped conventionally into the payload of the carrier frame and a carrier header is appended (step 100). If a compression indicator is found in step 94, then node 18 sends one or more header fields sufficient to uniquely identify a traffic flow and/or service instance to the compression store to locate and retrieve the correct compression key for that traffic flow and/or service instance (step 96), referred to herein as index header fields. The node then implements the header compression scheme by replacing header information 48 of the client frame 50 in first network 12 with the compression information 60 (step 98). The header information 48 which is replaced comprises either a predetermined number of header fields or the entire header 48 of the client frame 40. Once the client header information 48 has been removed and replaced with compression information 60, the payload 46 and compression information 60 is mapped to the payload 52 of the carrier frame 50 and a carrier frame header 54 is appended (step 100).

Thus one or more (but preferably all) header fields from the received client frame 40 are replaced by compression information 60 which has a small bandwidth requirement. The carrier frame 50 including the compression information 60 is then forwarded over carrier network 20 to the next node (in the exemplary network shown in FIG. 1 this would be WAN node 22).

Optionally, a compression indicator is included in the carrier header 54 to indicated that its payload 52 contains a compressed header. For example, a compression indicator is provided in the form of a special Ethertype value (shown as ETxxxx in header 54 FIG. 3B) in one embodiment of the invention, or the Ethertype value corresponding to the communications protocol of the dummy data structure which comprises the compression key data.

The frame is then transmitted on to the nodes 22, 24, 26 along the predetermined path for that traffic flow/service instance in the carrier network 20. Nodes 22, 24 will process the carrier frame 50 and its header 54 in a conventional manner however, when the carrier frame is received by node 26, it will be processed differently to restore the header information.

Figure 6:
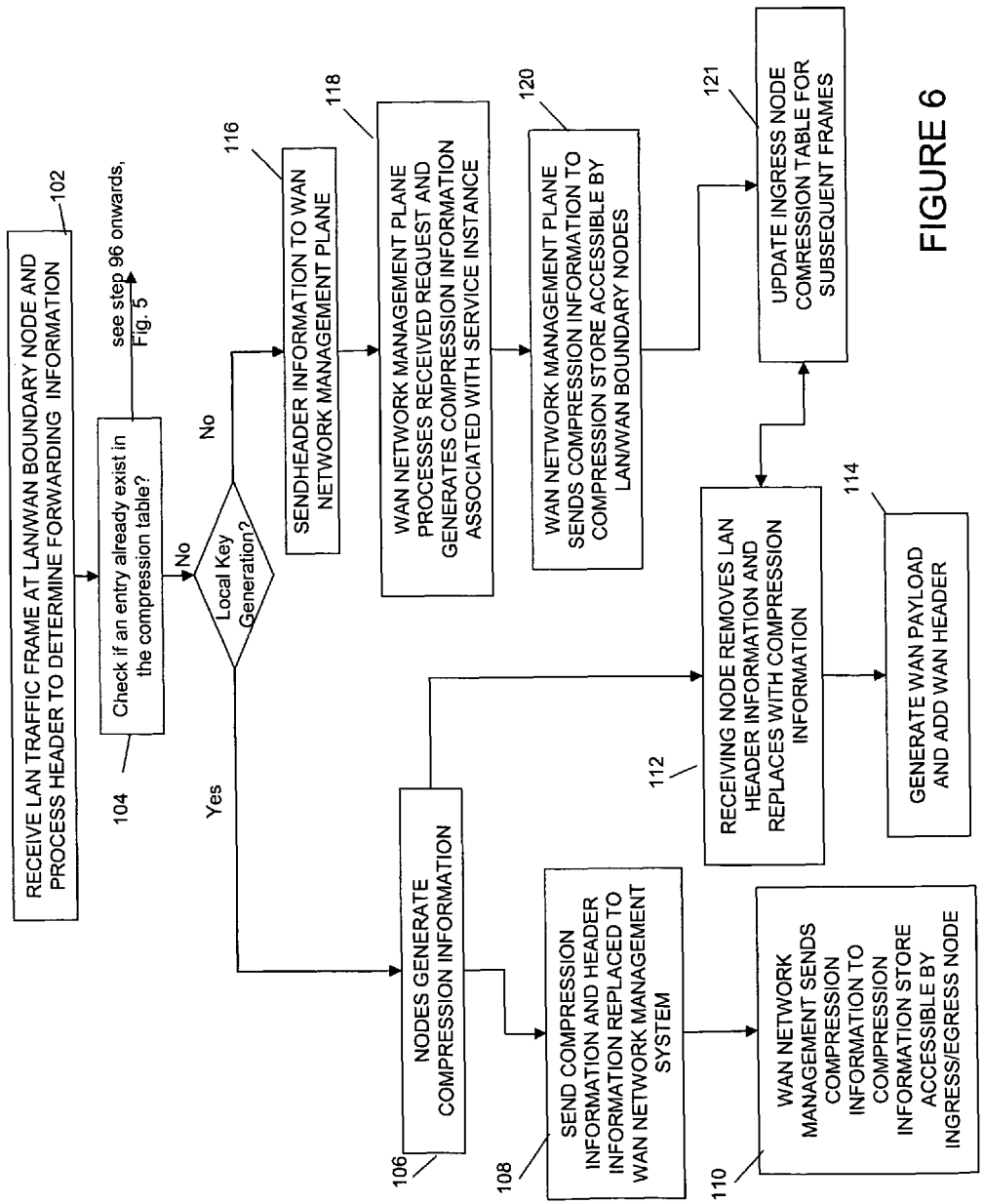
FIG. 6 shows how a second ingress node processes a received frame to dynamically generate header compression information and implement a header compression scheme according to another embodiment of the invention.

FIG. 6 shows an alternative embodiment of a method of generating compression information dynamically at the ingress node 18 to carrier network 20. In FIG. 6, when node 18 receives a request for a new service instance (or a new traffic flow), the forwarding look-up operation that node 18 performs triggers the generation of the compression information 60 if this determines a carrier network is to be used.

In FIG. 6, two alternative methods of dynamically generating compression information in this way are shown. When a boundary node 18 between the first network 12 and carrier network 20 receives a frame 40 (step 102), the outmost header 48 of the received frame 40 is processed in order to perform a look-up operation performed using a forwarding, table (step 104). If the look-up operation indicates the carrier network 20 is to be used by the frame 40, node 18 checks if compression information 60 already exists for the traffic flow and/or service instance to which the frame 40 belongs by performing a look-up operation for the compression data store which is associated with node 18.

If the compression information data store already contains compression information 60 for frame 40, then this is used to replace the client header information 48 of that frame, for example, by using a method such as that shown in FIG. 5. If no compression information 60 is located in the data store, then compression information is dynamically generated either locally by node 18 itself (shown in the left-hand side of FIG. 6) or by the carrier network management/control plane 8 (shown on the right-hand side of FIG. 6) depending on the compression scheme adopted.

Local dynamic compression information 60 generation requires the carrier network ingress node 18 to generate compression information itself based on the header information 48 it has extracted from a received traffic frame (step 106). However, to enable the header information 48 that the compression information 60 will replace to be recovered, node 18 communicates the compression information 60 in association with the header information 48 it has replaced to the carrier network management/control plane (step 108). The carrier network management/control plane 8 then sends the compression information 60 and associated header information 48 to a compression information store for use by a node 26 which provides egress for that traffic flow/service session from the carrier network 20. This enables the egress node 26 to de-encapsulate the compression information from the payload 52 of the carrier frame 50 and restore the header information 48.

Accordingly, in the embodiment shown on the left-hand side in FIG. 6, ingress node 18 removes one or more header fields from the received frame 40 and replaces these with the compression information 60 (step 112). Node 18 then places payload 48 and compression key 60 into the carrier payload 52 and appends a carrier header 54 (step 114). To enable subsequent frames belonging to the same service or traffic flow to be assigned the same compression header 60, either the carrier network ingress node 18 updates its compression information data store (see step 121) or the carrier network management/control plane 8 sends the compression information data to the compression table associated with node 18 to update it (see step 112).

In this embodiment, there is a risk that the nodes may generate duplicate compression information depending on the way the compression information 60 is generated by node 18. Preferably, node 18 will generate compression information 60 randomly on a per received traffic flow/service request basis. Node 18 sends the details of the compression information 60, any index header fields required for subsequently assigning the same compression information 60 to another frame in the same traffic/service flow, and all header information that the compression information is to replace in the carrier network 20 to the network management/control plane 8 (step 108). The WAN network management/control plane 8 then sends the compression information including the associated index fields and header fields to the egress node 26 for that particular traffic flow or service instance (step 110) and can at this point optionally perform a check for any compression key duplication, which if found could generate an alert to node 18 to reassign another compression key.

in FIG. 6, the right-hand side shows an embodiment in which the carrier network management/control plane 8 generates compression information 60 dynamically in response to a request from ingress node 18. Node 18 sends the request for compression information to be generated by providing the header information which the compression key is to replace to the network management/control plane 8 (step 116), The request may also indicate which header fields are to subsequently function as index header fields for retrieving, the compression key from the compression information data store associated with the ingress node 18, The network management/control plane 8 responds by processing the request and generates an appropriate compression key 60 (step 118). The compression key 60 and index field information are then sent to the compression information store used b the ingress node 18 to the carrier network 20 and the key 60 and the replaced header field information are sent to the compression store used by the egress node 26 (step 120).

Whichever method is used to generate the compression key 60, the compression key and the replaced header fields must also be sent to the egress node for the carrier network 20 and the compression key and the index-header fields required to retrieve the compression key must be sent to the compression information data store associated with the ingress node 18 for the carrier network 20. The ingress and egress nodes which are configured to implement the compression scheme of the invention and assign and/or generate and/or write into the "dummy" data structures and/or recognise in a dummy data structure compression key information are also referred to herein as "special edge nodes" or SENs in order to distinguish them from other nodes in the carrier network which are not capable of recognizing that the carrier traffic units have encapsulated "dummy" data structures and which instead process the carrier traffic units assuming the payload is that which is indicated by the "dummy" data structures when functioning in a conventional manner.

As previously mentioned, the format of the compression key 60 can take any suitable form but the inventors' preference is for a format which conforms to that used by the Multi-Protocol Switching Label label format. While a special edge node would be arranged to recognize the presence of some MPLS client data comprising the compression key information (the label value in a dummy MPLS header, other nodes in the carrier network would, if they inspected the contents of the carrier frame see only an MPLS header) and assume the payload was also MPLS (or whatever the MPLS payload encapsulated).

To retrieve the correct key to replace header fields in a traffic flow and/or service session over the carrier network, the ingress node 18 uses one or more index-header fields. The index-header fields can comprise any suitable combination of one or more header fields which are sufficient to identify a traffic flow, for example, a tuple of SA, DA and VLAN-ID are used as index fields. These index fields used to look-up the appropriate compression key 60 need not comprise all the header fields the compression key 60 is to replace.

The index header fields may be included in the User Network Interface (UNI) specification that client networks must conform to if a compressible frame 40 received from a client network 12 is to have its header fields mapped to the pre-assigned compression key at the ingress node 18 to the carrier network 20. Alternatively, a compression scheme can be implemented based on a single header field such as the Service Identifier header field which is provided in PBB-TE frames. For example, in one embodiment of the invention, a service instance is created to carry any traffic which is to be compressed. The service instance relates generally to heterogeneous traffic, i.e., mixed types of traffic such as, for example, VoIP and other types of compressible traffic but in alternative embodiments a service instance relates to a single traffic type.

All frames mapped to this service instance are compressed by the edge node 18 to the carrier network 20. For example, if the carrier network is a PBB-TE network and node 18 comprises an I-Component node, then the client frames 40 can be mapped to service instances by node 18. One or more compression table entries are then needed per service instance depending how many unique headers fields 48 are mapped to the service instance. It is also possible to use an application profile to indicate that a frame is to be compressed, for example, if a service instance only carries VoIP then it will be compressed.

As previously mentioned, in either case, the compression key 60 is transported as a dummy data structure within the payload 52 of a carrier frame 50 as it is forwarded across the carrier network 20 until the carrier frame 50 reaches an egress node (a special egress node), where a de-compression process is performed which is described in more detail with reference to FIG. 7.

Figure 7:
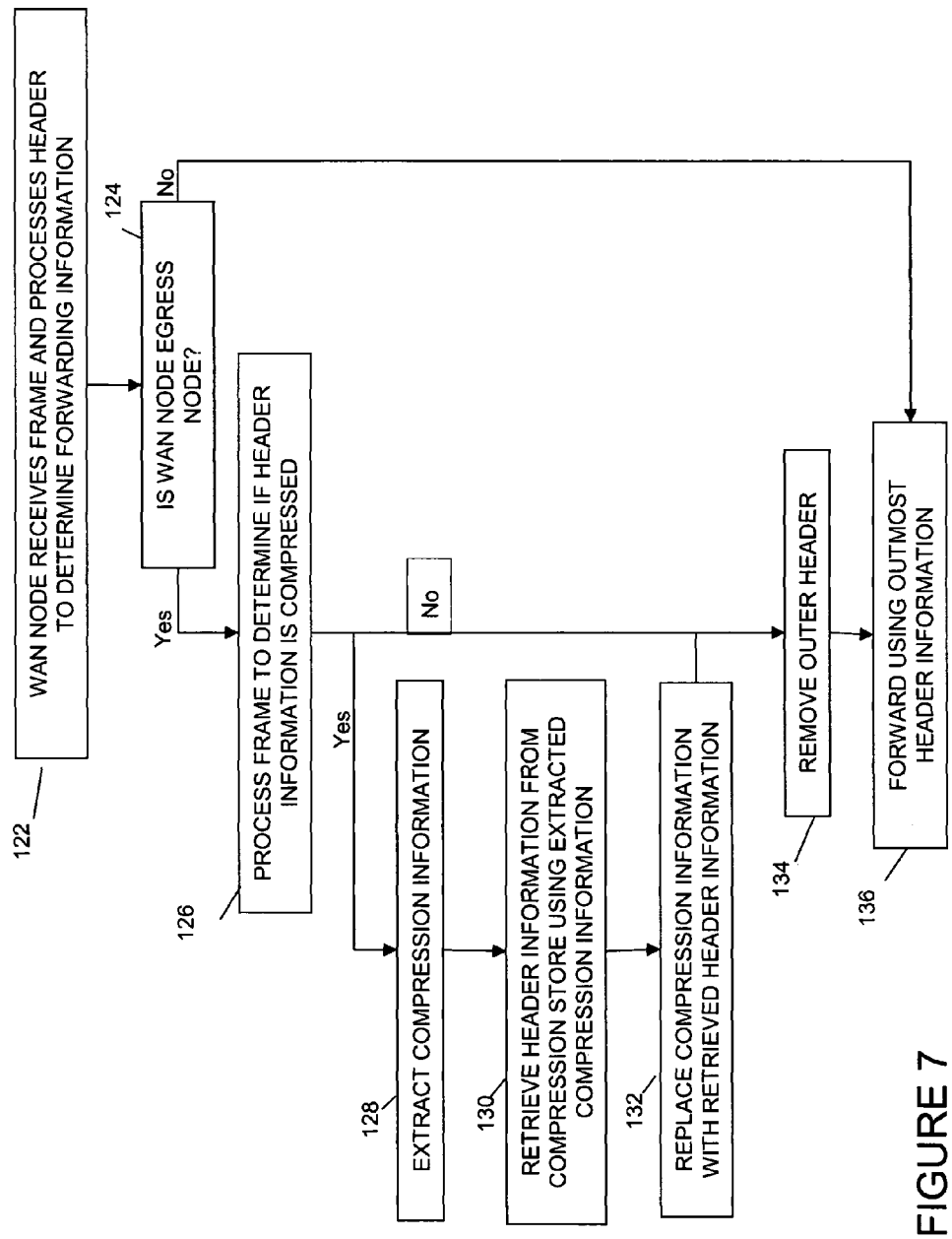
FIG. 7 shows a method by which nodes in a network implementing a header compression scheme according to an embodiment of the invention process a compressed header and restore header information if the node is an egress node for that network.

In FIG. 7, a carrier network node receives traffic frame 50 and processes its header 54 in a conventional manner to determine forwarding information (step 122). The processing determines if the traffic is to be forwarded to another node within the carrier network 20 or to a node 28 outside the carrier network 20 (step 124). If the traffic is to remain within carrier network 20, then the forwarding process continues in the conventional manner based on the outmost header (the carrier header 52) (step 136). If, not, and if the carrier network node is a special edge node such as node 26 shown in FIG. 1, then the header 54 is processed to determine if a compression indicator is present (step 126), for example, if it contains a particular Ethertype value. If no indicator is found in the header 54, carrier frame 50 is processed to remove the carrier header 54 (step 134) and the next outmost header 48 will is used to forward frame 40 (step 136). This header is then processed to determine if a compression indicator is present. At some point in the processing, e.g. at the point of processing the internal header dummy data structure in some embodiments, however, the presence of the compression key will be found, in which case this will then also function as a compression indicator.

When a compression indicator is found, the received frame 50 is processed to extract the compression key 60 (step 128) from the payload of the carrier Ethernet frame 50. Alternatively, a special field such as an extension field of header 54 can provide the compression key and/or function as a compression indicator.

Once the compression key 60 has been extracted, it is used to retrieve all appropriate header information from a compression table (step 130) which has been populated by the network management/control plane 8. This can be done by a hashing operation for example, which uses the compression key as the hashing key to enable rapid retrieve of the header information. Once the header information has been returned to the egress edge node 26, the egress edge node 26 is able to regenerate the header fields 46 for frame 40 which the compression key replaced (step 132). The outer header is removed at a suitable point in the recovery operation for the original header (shown as step 134 in FIG. 7). This enables connection oriented frame 40 to be forwarded within a third network 14 towards its destination address (for example, node 28 in LAN 14 as shown in FIG. 1) (step 136).

When a succession of carrier networks implement a header compressions scheme according to embodiments of the invention, the network management/control plane must provide details of a compression key to recover the header information which is suppressed in the new network.

Figure 8A:
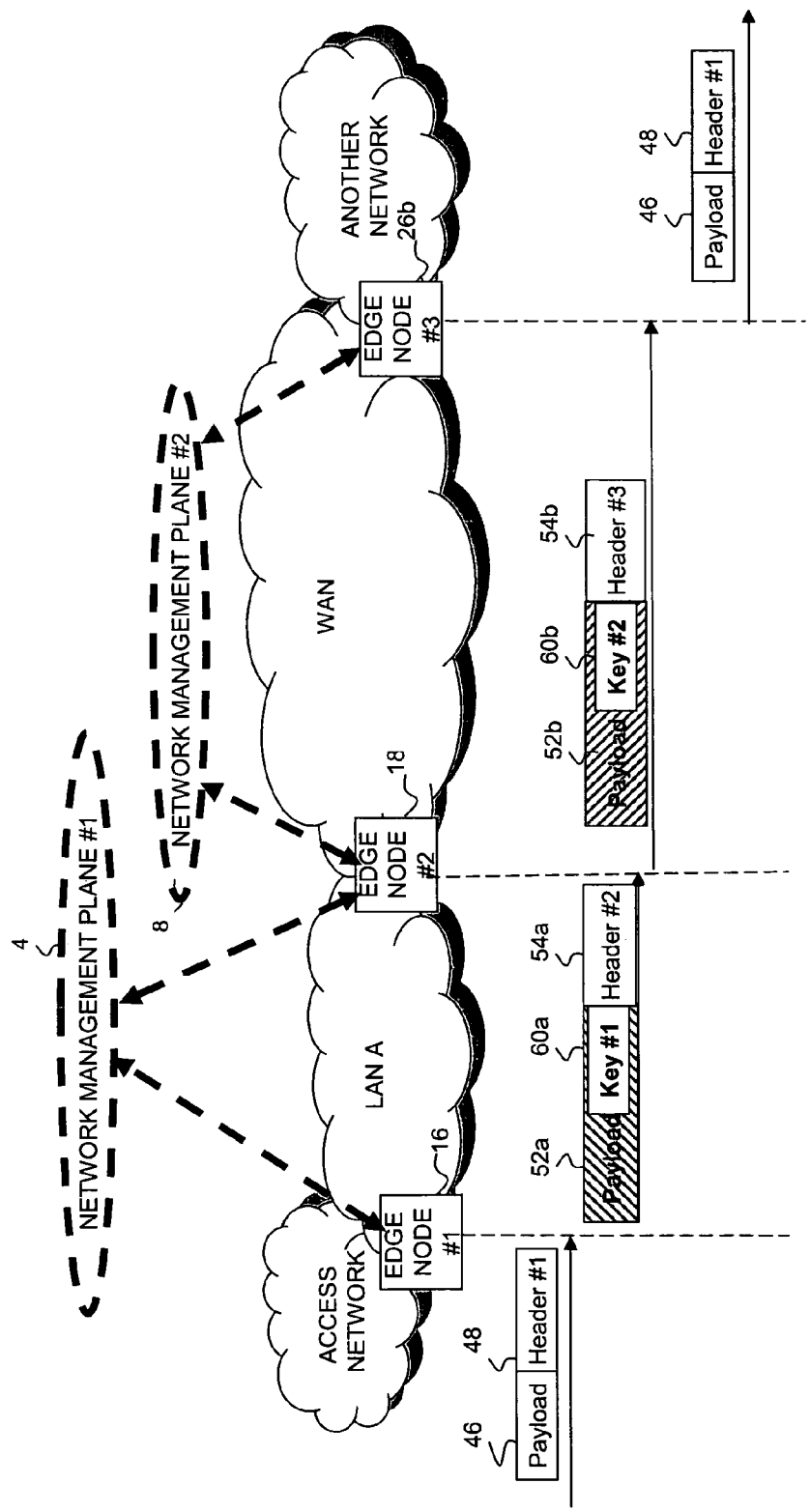
FIGS. 8A and 8B show embodiments of the invention which implement header compression schemes for a plurality of carrier networks.

FIG. 8A shows an exemplary scenario in which a header compression scheme according to embodiments of the invention is implemented across a plurality of carrier networks.

In FIG. 8A, a client connection-oriented Ethernet frame 39 comprises a payload 46 and header #1 (header 48). The client frame 39 is received by the edge node 16 between a connection-oriented Ethernet access network and LAN A which provides a carrier service. Carrier LAN A has a network management/control plane #1 and implements an embodiment of a header compression scheme according to an embodiment of the invention which replaces the header #1 48 used in the access network with compression key 60a which is carried within the payload 52a of carrier frame 50a within LAN A.

Accordingly, edge node 16 comprises a special edge node which appends new header 54a to the payload 52a of carrier frame 50a which carries sufficient information to forward the carrier frame within LAN A along a predetermined path towards its destination. The network management/control plane for LAN A also communicates header compression information to populate one or more compression tables accessible by at least the egress node in LAN A along the predetermined route with the compression key 60a and header information required to enable the header information removed from the edge node 16 to be recovered at another special edge node (e.g. node 18 shown in FIG. 8a). Edge node 16 also adds a special header compression indicating Ethertype value to the header 54a which is used to indicate the header 54a is associated with a payload which includes a compression key 60a.

Accordingly, at special edge node 18, when the LAN carrier frame 50a is received, header 54a will be processed to determine what forwarding action is to be performed. This will identify that the frame 50a is to be routed into the WAN and the presence of the compression indicator alerts node 18 to the need to recover the compressed header information from its compression table. Accordingly, special edge node 18 will perform a header recovery method according to the invention which comprises a de-encapsulation operation to recover the compression key 60a from the payload 52a of frame 50a and uses this to perform a look-up operation on its compression table to restore the original client header information 48. The header #2 used in LAN A will be removed and the compression key 60a is recovered from the payload 52a.

Node 18 then sends the compression key to the compression table associated with node 18 which uses the key to perform a look-up operation to determine a data record which contains the header information associated with that particular compression key. The header information is then returned to the node 18.

The original client frame 39 at this point could be restored by removing the compression key and replacing the original header information (which in one embodiment involves writing over the compression key information in the "dummy" header with the original header and header field values and in another embodiment comprises removing the dummy data structure (e.g. a dummy header) and replacing it with the original header data structure and field values).

Alternatively, as shown in FIG. 8a, however, the compression scheme is then repeated by special edge node 18 but this time replacing the client header information with a new compression key 60b which is for use within the WAN. Node 18 now removes the header information 48 which is to be replaced by the compression key 60b within the WAN, encapsulates the original client payload 46 and compression key 60b within the payload 52b of the WAN carrier Ethernet frame 50b, and appends a header 54b for providing a compression indicator in the form of a special Ethertype to the payload 52b.

The second compression key 60b is associated with the header information it has replaced within the WAN by the WAN network management/control plane (either statically or dynamically). The WAN network management/control plane 8 provides compression header information which associates the compression key 60b with the header information it has replaced in one or more compression tables associated with at least the egress node in the WAN along the predetermined path for that traffic frame. The outmost header 54b is then used for forwarding the frame 50b within WAN along the predetermined path in the WAN.

At the egress node 26b for the WAN, the header information is processed and the forwarding table will indicate that the traffic frame is to exit the WAN.

In one embodiment, the presence of a compression indicator in the WAN carrier frame, for example, the presence of a special Ethertype value in the header of an Ethernet carrier frame when WAN 20 is an Ethernet carrier network, indicates that the payload of the WAN contains a compression key which must be removed and replaced with header information from a compression table. Accordingly, a look-up operation will be performed by node 26b using the compression key 60b to retrieve the header information from its compression table. The header information is then restored to client frame 39 which is then forwarded by node 26b over another network.

The communications system shown in FIG. 8A thus implements a compression scheme which does not require the two carrier networks to share information about their compression keys. As the frames are routed along a predetermined path, within each network the egress node will be known to the network management/control plane in advance, which means that the compression table for just the egress node needs to be populated with the headers which the compression key replaced. Moreover, within each network, the compression keys are set up on the basis of the same key being used by all frames in the same traffic flow and/or service request, so that the network management/control planes of each carrier network only needs to communicate the compression key once per traffic flow/server request to the relevant egress node. This greatly enhances the security of the carrier network as it is not possible within the remaining nodes of the network to determine anything about the client source and/or ultimate destination where this is outside the carrier network as all such information is conveyed separately by signaling sent in the network management/control plane from the ingress node to the egress node.

Figure 8B:
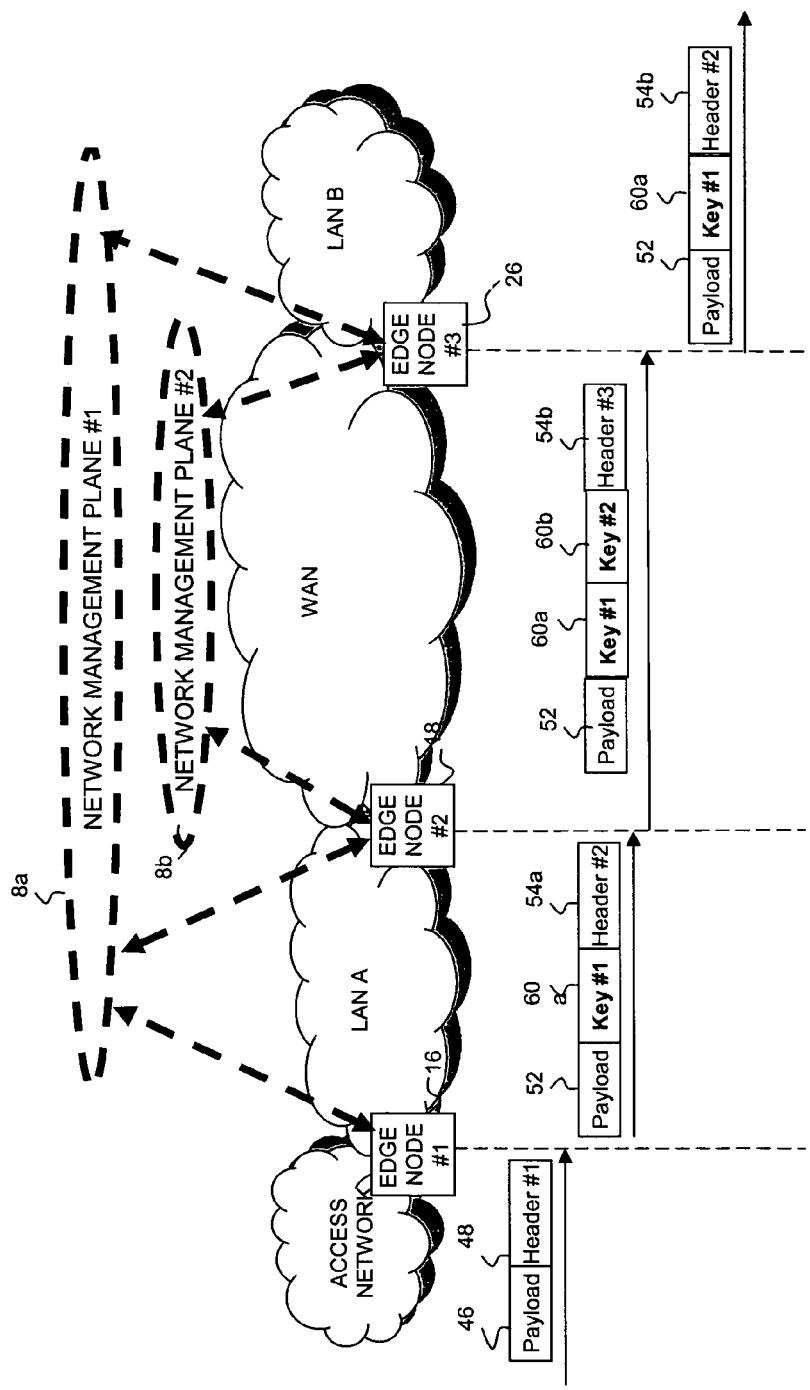

FIG. 8B shows another embodiment of a communications system comprising a plurality of carrier networks within which header compression is implemented according to an embodiment of the invention. In FIG. 8B the elements retain the numbering scheme shown in FIG. 8A as appropriate.

In FIG. 8B, the other network is now another carrier LAN, LAN B, which shares the same network management plane #1 as LAN A. This means that it is useful to retain the compression key 60a used in the first carrier network, LAN A, within the second carrier network (the WAN). Accordingly, now at the boundary node between the LAN A and WAN, the first compression key 60a is retained. The boundary node generates a new compression key 60b which is used to replace the header information used to forward traffic only within LAN A and LAN B. The new key 60b replaces header #2 and is placed alongside the LAN payload 52a in the WAN payload 52b. A new header #3 (54b) is appended to the payload 52b for forwarding the frame within the WAN. At the edge of the WAN, compression key 60b is used to decompress and recover header #2, which is used for forwarding within LAN B. At an egress point to LAN B, the original header 48 can be recovered (not shown in FIG. 8B).

A communications system such as that shown in FIG. 8B will result in a series of compression keys being added each time a network boundary is crossed, each of which must be used in the correct order to recover the original payload and header #1. It is also possible to implement such a compression scheme which concatenates compression keys if the compression key information is communicated between network management/control planes so that at each boundary node the compression key and header information for each compression key carried is appended to the compression table(s) within the next carrier network so as to enable the inner header information to eventually be recovered. In such an embodiment, the header recovery process will be iterated recursively at a special edge node (also referred to as a network boundary node) until the special edge node performing the recovery process determines that there is no additional header compression processing to perform at that point.

The invention is advantageous as each time a header is conveyed across a carrier network, there is a bandwidth reduction. For example, if a redundant PBB/PBB-TE header is replaced with a 4-byte key, when a voice data packet is being carried across a single carrier network then the bandwidth efficiency is 64/(64+22+4)=71%, i.e., as opposed to sending 64/(64+22+22)=59% bandwidth efficiently if the full 22 bytes of redundant header information is retained. If more carrier networks are used, the compression scheme further improves bandwidth efficiency.

The compression key conforms in format to a form suitable either for carrying in payload or within a header fields or extension field to a header field. To facilitate the processing of the key, regardless of whether it is carried in payload or in a header or extension field, it may be provided in a format which is known in the art to be associated with the format required by a particular header field or take a format conforming to provided by the MPLS label field. When carried in payload, in embodiments, the compression key is located immediately following the payload it is associated with and before the outmost header, as shown in FIG. 6, and is retrieved using any appropriate method known in the art for extracting information from payload locations (for example, such as a pointer mechanism). In alternative embodiments of the invention, however, the compression key may be located elsewhere in the payload.

The value of the compression key is preferably selected randomly or alternatively in some preconfigured manner from a list of available keys, the latter requiring some monitoring scheme by the network management system to prevent duplication.

Figure 9C:
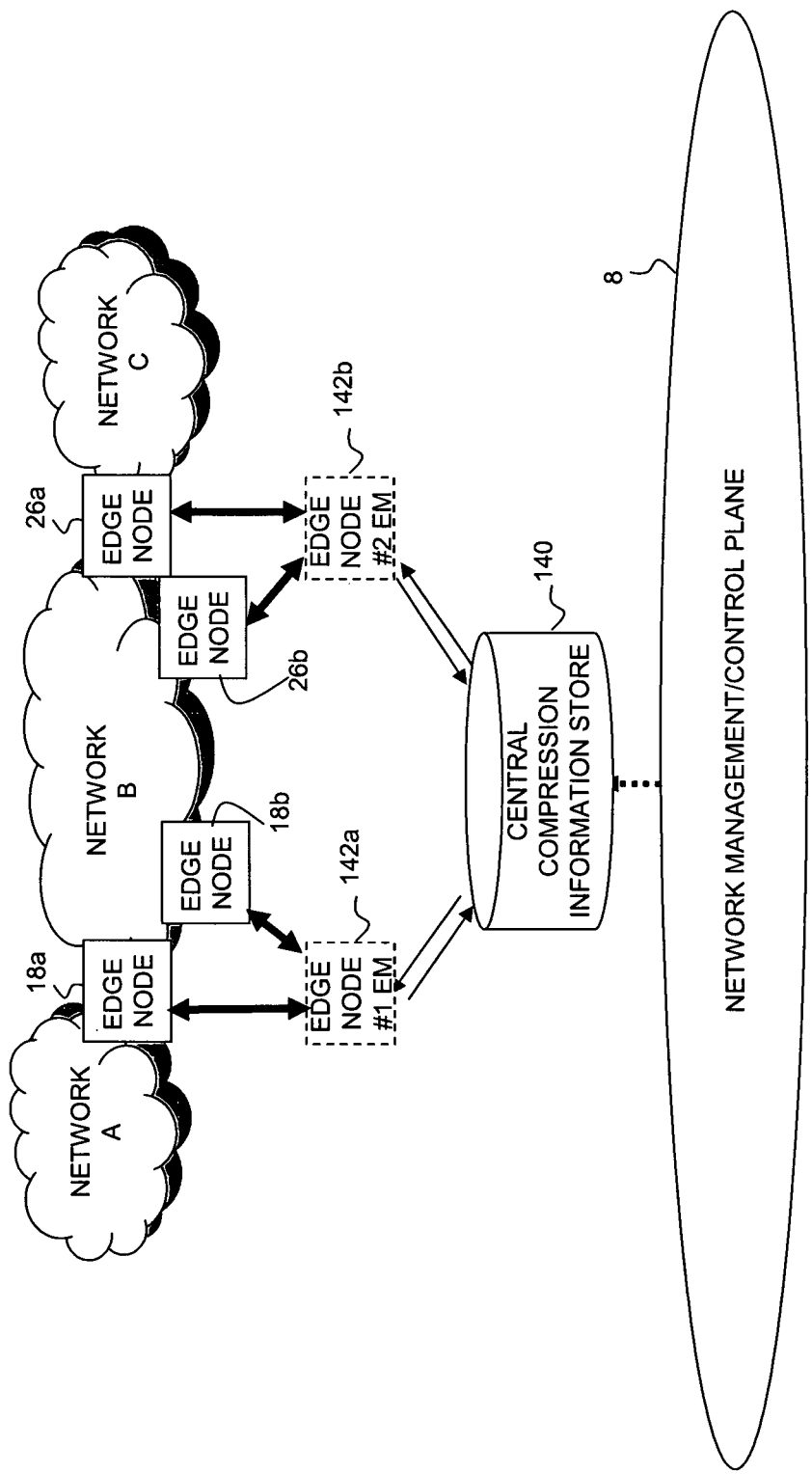
FIG. 9C shows a distributed compression storage architecture in which element managers associated with a plurality of edge nodes access a centralised compression information store.

FIGS. 9A, 9B and 9C show the architecture of the compression information stores and how these can be distributed within the carrier network. The compression information can be appended as an extension to forwarding information and co-located with forwarding tables for the carrier network nodes. Alternatively, the compression information stores may have an independent architecture.

FIG. 9A shows a local compression information storage architecture according to an embodiment of the invention in which boundary node SEN 18 at the edge of the client network (shown as network A) and the carrier network (shown as Network B) is associated with a first compression table 138a. Egress node SEN 26 of network B is associated independently with another compression table 138b and the network management/control plane 8 for the network ensures that appropriate signalling information is sent out to populate the compression table 138b of the SEN egress node and any other SENs in network B as appropriate.

FIG. 9B shows a centralised compression information storage architecture according to another embodiment of the invention in which the network management plane 8 populates a single central compression store 140 to which the SENs, e.g. ingress node 18 and egress node 26, of the carrier network B must communicate with to determine which compression key is to be used to replace which header information. This increases the signalling overhead within the network.

FIG. 9C shows a distributed compression storage architecture in which element managers 142a,b are each associated with a plurality of special edge nodes SENs (18a,18b,26a, 26b respectively). Each element manager 142a,b is associated with a central compression information store 138. The element managers 142a,b, push relevant compression information down towards the special edge nodes which they retrieve on request from the compression table.

Figure 10:
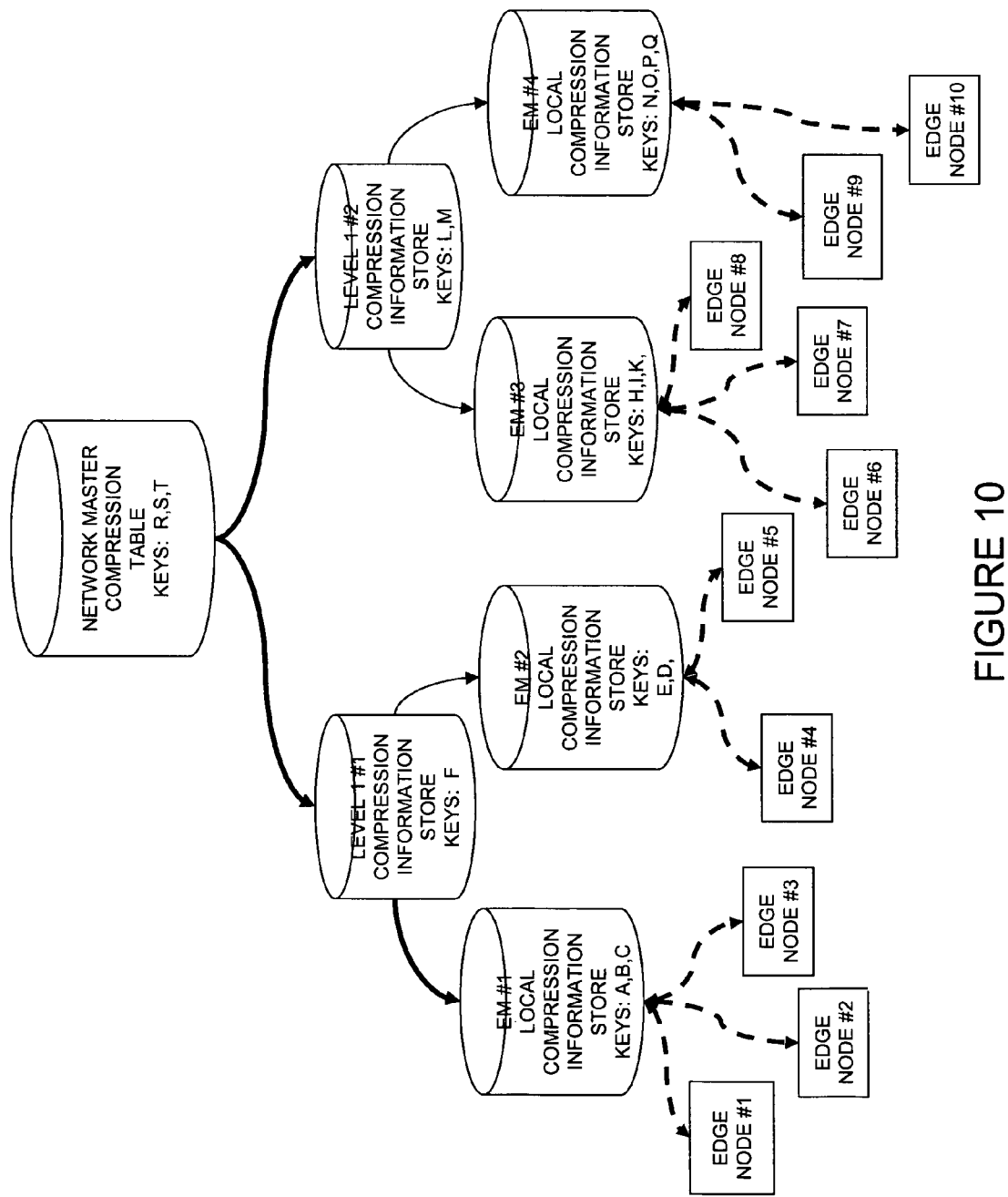
FIG. 10 shows how compression information can be distributed in a hierarchical compression information storage architecture by element managers.

FIG. 10 shows how compression information can be distributed in a hierarchical compression information storage architecture by element managers, in which element managers retrieve compression information for traffic flows and/or service session requests that the network management/control plane has determined will use the special edge nodes with which they are associated. Those of ordinary skill in the art will appreciate that only an exemplary selection of keys are shown for clarity purposes only. The compression tables are arranged in a hierarchy so that the keys can be distributed within the network according to the connection-oriented path established by the control plane which will be sent to forwarding tables for the nodes in the network.

As shown in the schematic diagram of FIG. 10, a master compression table contains the compression keys R,S,T which are available for replacing redundant header information for traffic flows which are across the carrier network and these keys are accessible by all edge nodes in the network. At the next level of the compression information hierarchy, there are two compression information stores, the left-hand side compression information store storing header information for compression keys F the right-hand side compression information store storing header information for compression keys L and M. These keys assigned to traffic flows and/or service requests which require traffic frames to move between the domains of each element manager and so are accessible to a larger number of nodes than the compression keys stored in the third level compression information stores which are associated with traffic flows/service sessions between nodes associated with the same element manager.

For example, as shown in FIG. 10, EM#1 which is associated with edge nodes #1, #2, and #3 and holds compression keys A,B,C which are used by the edge nodes #1,#2,#3 for traffic flows only between the edge nodes #1,#2, #3. If edge node #1 receives a traffic flow (or service request) which requires a connection-oriented path to be established within the carrier communications network to edge node #4, then it will need to use a compression key which is stored at a location accessible by the edge node #4, here the right-hand side compression information store at the second level of the compression store hierarchy, for example, key F. If edge node #2 receives a traffic flow (or service request) which requires a connection-oriented path to be established within the carrier communications network to edge node #10 say, then it uses a compression key from the compression information store accessible to edge node 10#, for example, compression key S from the master compression table shown in FIG. 10.

Figure 11:
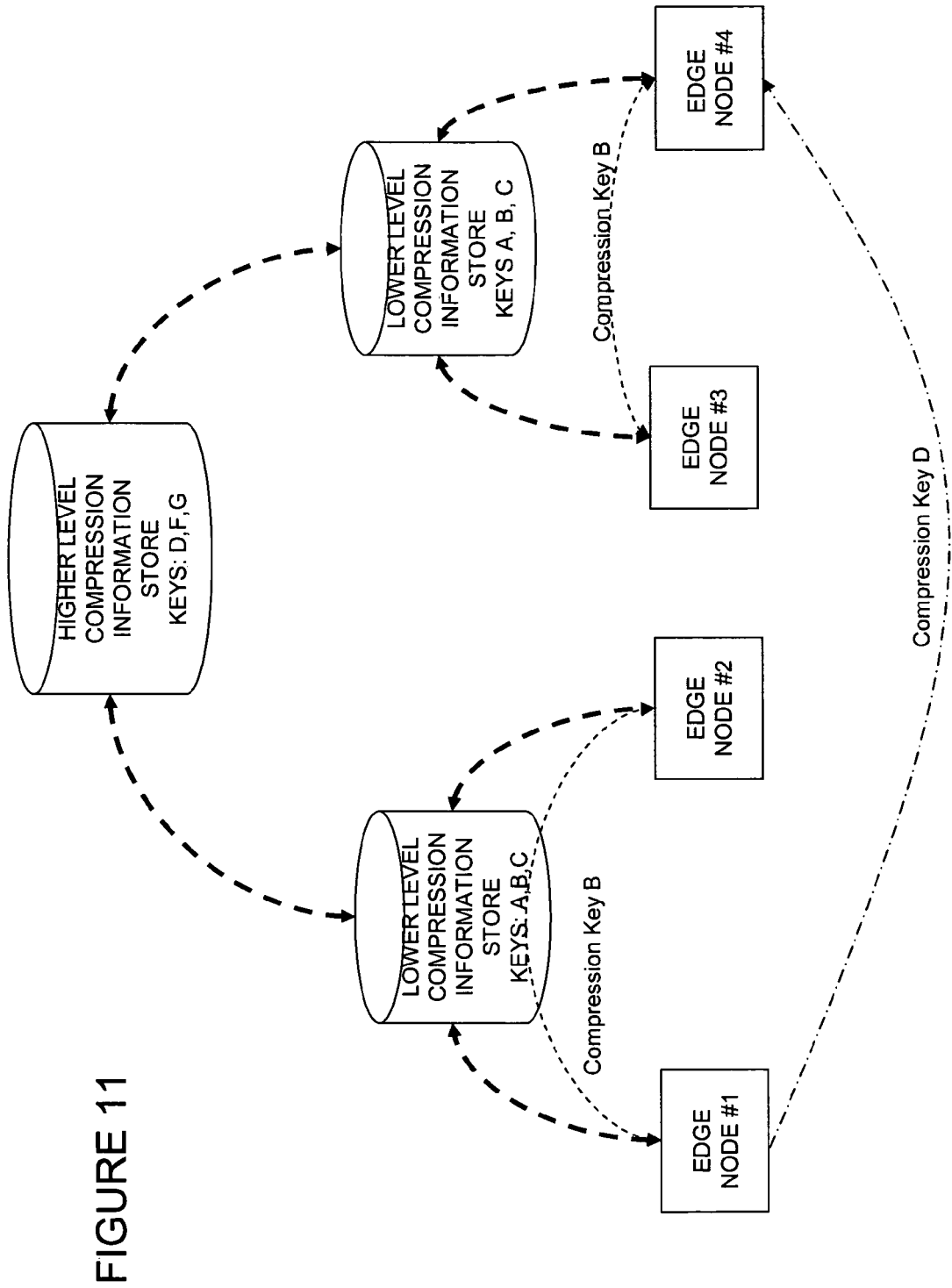
FIG. 11 shows how compression information can be reused in a hierarchical compression information storage architecture.

The compression information architecture of FIG. 10 requires in practice a potentially huge number of compression keys to be generated and managed by the network management/control plane. To reduce the number of compression keys which are stored in the network, FIG. 11 shows how compression information can be reused in a hierarchical compression information storage architecture. As the compression information is pushed down from a central store to each element manager which then only pushes down compression keys for the traffic flows with which its edge nodes are associated with using the forwarding tables, it is possible for compression keys to be reused by nodes where there is no possibility of traffic flows and/or service requests with the same compression key using the same node.

In FIG. 11, there are only 6 compression keys available. Compression keys A,B,C are used for traffic flows/service sessions between nodes within the element manger domain #1 and compression keys A,B, and C are reused for traffic flows between nodes within another element manager domain #2. Compression keys D,E,F are used for traffic flows between the element manger domains, for example, from edge node #1 to edge node #4.

This is shown schematically in FIG. 11 by traffic flowing along the dashed path from ingress edge node #1 to egress edge node #2 across the carrier network using compression key B which is also used in the other element manager domain for the traffic flow from ingress edge node #3 to egress edge node #4. However, a higher level compression key, here compression key D is used when sending traffic from ingress edge node #1 to egress edge node #4 across the same carrier network.

The embodiment of the invention shown in FIG. 11, enables, for example, compression key re-use for traffic flows in a carrier network in which the (SEN) ingress and egress nodes for a traffic flow are geographically disparate from other (SEN) ingress and egress nodes. For example, a traffic flow from a first SEN in one city to a second SEN in the same city may use the same local compression key as the local compression key used for another traffic flow from a first SEN in a different city to another SEN in that city.

The above description of the preferred embodiments does not include known functional equivalents or obvious modifications to the features described where these are apparent to one of ordinary skill in the art. As will be appreciated by those of ordinary skill in the art, where specific reference has been made to a LAN or WAN, these references can be replaced with first and/or second network etc as appropriate to distinguish the networks, the use of the terms LAN and WAN being primarily to indicate the different networks and/or different carrier networks. Where specific reference is made to LAN or WAN in the above description, those of ordinary skill in the art will appreciate that the above embodiments are not limited to specific types of geographical network domains such as LANs and WANs but can be applied in any scenario where a connection-oriented Ethernet traffic carrier service is being provided to other Ethernet traffic.

It is possible to supplement the above embodiments of a compression scheme according to the invention with additional compression schemes, for example, header fields 44 shown in FIG. 2 can be compressed either using other known compression schemes, to further increase bandwidth efficiency in the carrier network 20, or in conjunction with the first network header fields 48. For example, if the PBB-TE header 48 and the other L2 headers 44 can be collectively replaced by a single compression key 60, although a larger compression store data record is then required to store the replaced header information and the associated compression key than if just the PBB-TE header 48 is being replaced.

When a longer key is required and the key is an MPLS label, standard MPLS label stacking could be used to double the key size. One MPLS label can provide a 20-bit key. A 2-level label stack can provide a 40-bit key and the MPLS label stack level can be increased as required. Alternatively one or more of the other fields in an MPLS header may be used to house compression key data.

The compression schemes described by the above embodiments of the invention enable the headers of connection-oriented Ethernet traffic frames to be compressed when received by the relevant special edge nodes as they implement the forwarding operation. This enables the headers to remain compressed from end-to-end along the path they are forwarded along between end-stations as the compressed headers remain transparent to intermediate nodes. The special edge nodes are "special" only in that they are configured to recognise the compression key information in a dummy data structure in a received traffic unit and process the traffic unit based on the dummy data structure comprising the compression key instead of the values of the dummy data structure indicating addressing information or other information which the communications protocol that the data structure conforms to would conventionally indicate.

The term "dummy" data structure (e.g. a "dummy" header) is used herein to indicate that the data structure does not contain data for its conventional use, but instead provides compression key information disguised by the formatting of the data structure.

The compression information data stores (also referred to herein as compression tables) can be managed by the existing network management/control plane system of the carrier network and can also be associated with forwarding table information stores.

In one embodiment, the compression key information is not generated in dependence on the data extracted from the fields of the header it replaces. This means that even if the dummy data structure was inspected within the carrier network the identify of the client data is obscured and not determinable. It is only at a special edge node that the original header information is recoverable. As a result, it is reasonably secure to send this compression key information over a carrier network as it is only at the SEN egress node of the carrier network that the original header information can be recovered. Once a compression table entry has been set up for a particular traffic flow/service instance, all frames in that traffic flow/service instance will utilise the same compression key without needing to signal this across the network which further reduces the amount of signalling required to manage a compression technique according to the invention.

Those of ordinary skill will find it apparent that more than one level of encapsulation using a key-based look-up is possible, and where this is required, the keys can be concatenated, as depicted in FIG. 8B. In this way, by replacing header fields with a key having a smaller size than the original header, the size of the frame is not increased significantly each time a header field is replaced. For example, a MPLS shim label of 4 bytes could replace a MAC header field of 22 bytes.

The term Ethernet frame is used herein as this is the standard term used to refer to a unit of Ethernet traffic, whether connection-less and/or connection-oriented. The header information which is replaced may comprise connection-less and/or connection-oriented Ethernet traffic information, providing the appropriate header information is propagated within the carrier network for retrieval at the egress node to the carrier network. The invention may also be applied to other layer two data link carrier networks providing the dummy data structures which are used to replace the original client header result in a lower data volume than the data volume of the original client header.

In one or more of the above embodiments in which a carrier Ethernet service is provided within the carrier Ethernet frames an identifier can be provided in the form of a special Ethertype which indicates that the carrier Ethernet frame contains compression information which should either be removed before the frame is forwarded out of that carrier network. However, it is possible also for a special Ethertype to indicate that compression information is to be retained for removal by another carrier network if the compression key information is to be communicated by the network management/control planes between the first carrier network and the other carrier network.

Those of ordinary skill in the art will appreciate that in FIG. 1, only those nodes necessary to demonstrate the flow of traffic were shown for the sake of clarity and that in practice a far larger number of nodes may be provided in each network and that the communications links and traffic flow which were shown in FIG. 1 as simply unidirectional can support uni- and/or bi-directional communications between network nodes in other embodiments of a communications system in which the invention in implemented.

The term network management/control plane is used herein above to indicate a network management and/or control plane which provides control and signalling data to the network nodes while providing a traffic forwarding function within the network. The network management/control plane can be implemented remotely from the network nodes and/or as adjunct processors in any appropriate manner known to those of ordinary skill in the art.

The communications system shown in FIG. 1 comprises separate network management/control planes for the plurality of networks comprising the communications system, but in other embodiments of the invention the networks in the communications system may share the same network management/control plane. The form of client traffic which is carried over the carrier network can be either connection-less or connection-oriented Ethernet but the traffic provided within the carrier network is connection-oriented.

This enables in one embodiment of the invention for a method to be provided which reduces the bandwidth required to send a plurality of client traffic frames 40 over a carrier communications network 20 arranged to provide a carrier service to the client traffic frames 40. As shown in FIG. 2, each client frame 39 comprises client header information 48 and client payload 46 and was connection-oriented itself. However, it is possible for the client frame 39 to conform instead to a connection-less Ethernet communications protocol. The header compression method according to this embodiment, comprises at an ingress node 18 of the carrier network 20, determining redundant header information (one or more or all fields of the client header information 48). The header information is redundant in the carrier network (WAN 20 in FIG. 1) which is not used for forwarding the client frames in the carrier network, replacing at least part or all of the redundant header information 48 with compression information 60 having a smaller bandwidth than said replaced header information 48, and appending header information 54 to the payload of each said client frame to enable said client frame to be capable of being forwarded along a path in said carrier network to an egress node of the carrier network. The node 18 then sends the carrier traffic frame 50 comprising the client payload 46 and the carrier's header information 54 over the carrier network 20. At an egress node 26 of the carrier network 20, the method comprises processing each received carrier traffic frame 50 to extract compression information 60 from each received traffic frame 50. The extracted compression information is then used to perform a look-up operation which retrieves the replaced redundant header information 48 from a data store 138, 140. The client frame 40 is then restored by appending the header information 48 retrieved from the data store 138,140 to the client payload 46.

The same compression information is used to replace the same redundant header information for all the traffic having the same set of header characteristics. The ingress node 18 needs to send the replaced header information and the associated compression information 60 to the data store 138, 140 from which they can be retrieved when egress node 26 receives the corresponding traffic frames. However, the compression information 60 and replaced header information 48 is sent only once-over the network management/control plane 8 of WAN 20, whereas a plurality of traffic frames will use each particular compression information 60 within WAN 20, which produces overall a bandwidth reduction for all of the client traffic characterised by having the same header information 48 replaced by the same compression information 60. As an example, a plurality of client traffic frames can be characterised by having at least the same source address and destination address, or by having the same source address, destination address and virtual local area network identifier. Alternatively, or in addition to the above header fields being the same, a plurality of client traffic frames can be characterised by sharing the same service session identifier.

The compression information has a data format which enables it to be capable of being sent by a network management and/or control plane of the carrier network in association with the redundant header information it has replaced to a data store 138,140 accessible in the carrier network. The data store 138,240 needs to be one accessible by the egress node for the traffic associated with a particular compression key. The egress node is capable of being determined from the path established for the carrier traffic as the carrier network is connection-oriented.

It is also possible, as has been described herein above, for the compression information to be established when the client traffic is received by the client network. For example, if the client network is connection-oriented, then the compression information 60 can be sent to the network management and/or control plane 8 of the carrier network 20 by a network management/control plane 4 of the client network 12 for example, when the predetermined path for the traffic is established in the client network 12 as determining the path to the egress node 16 to client network 12 also establishes the egress node 16 as the ingress node 16 to the carrier network 20. Alternatively, the compression information 60 is generated when an ingress node 16 to the carrier network 20 receives the client traffic 40.

In embodiments of the invention, the client traffic comprises Ethernet traffic and the carrier network 20 provides a connection-oriented Ethernet carrier service to the Ethernet client traffic, and said compression key replaces the Ethernet header of each frame of the client traffic in the carrier network. The client traffic conforms preferably to the PBB or PBT or PBB-TE Ethernet communications protocols. The same compression key replaces the entire header for each frame of client traffic having the same service session identifier field value in the client header. In addition to and/or alternatively the same compression information is used for each frame of client traffic in the same client traffic flow.

The compression information conforms to the data format of one or more standard multi-protocol label switching (MPLS) standard communications protocol label data values.

The compression information is placed either in a predetermined header field of the carrier frame and/or in a predetermined position in the payload to which the carrier header is appended for forwarding in the carrier network. If placed into payload, in one embodiment, the carrier frame comprises a connection-oriented Ethernet frame which includes an Ethertype value to indicates the carrier frame payload includes the compression information for a client traffic frame. In other embodiments, other header fields can be used as appropriate for the particular communications protocol being implemented to determine a characteristic of the client traffic that indicates it is to follow a particular path from source to destination.

The term frame is used herein as a synecdoche for packet, cell, or any other appropriate term indicative of a traffic unit in a connection-oriented communications protocol which is suitable for implementing a header compression scheme according to the invention.

There are many more potential modifications to the embodiments of the invention described herein which are apparent to those of ordinary skill in the art and the scope of the invention should be accordingly determined by the accompanying claims.

The invention claimed is:

1. A method of reducing the bandwidth required to send a plurality of client traffic frames over a plurality of carrier communications networks, each carrier network being arranged to provide a carrier service to said client traffic frames, each client traffic frame comprising client header information and client payload, at least a part of the header information of a frame being usable by a node of a carrier network for forwarding that frame in that carrier network, the method comprising at an ingress node of a second carrier network:
   receiving a frame of client traffic from a first carrier network said frame haying been forwarded in the first carrier network using header information;
   determining first compression information is present in said frame which has replaced original header information not used for forwarding said frames in said first carrier network;
   generating second compression information to replace the header information used for forwarding said frames in said first carrier network;
   replacing the header information used to forward client payloads in said first carrier network with said second compression information; and
   appending header information to said client payload to enable forwarding of said received. frame of client traffic in said second carrier network,
   wherein in a data store. accessible to boundary nodes of said second carrier network, said second compression information is stored in association with one or more of the following:
   said replaced header information used for forwarding said frames in said first carrier network;
   said first compression information; and
   said original header information replaced by said first compression information.

2. A method as claimed in claim 1, further comprising at an egress node of said second carrier network:
   processing each received traffic frame to extract said second compression information from each received traffic frame;
   using the extracted second compression information to perform a look-up operation which retrieves information from said data store enabling said client frame to be restored.

3. A method as claimed in claim 1, further comprising at an egress node of said second carrier network:
   processing each received, traffic frame to extract said second compression information from each received traffic frame;
   using the extracted second compression information to perform a look-up operation which retrieves header information from said data store enabling said frame received from said first carrier network to be restored.

4. A method as claimed in claim 2, wherein said first compression information has a first compression key and said second compression information has a second compression key, wherein said second compression information is associated with said first compression information in said data store, and wherein said look-up operation comprises:
   retrieving said first compression key using said second compression key; and
   retrieving said client header information using said first compression key.

5. A method as claimed in claim 4, wherein said first compression key is used to replace the same original header information for all said traffic having the same set of header characteristics.

6. A method as claimed in claim 1, wherein. said second. compression information is sent to the data store accessible by said egress node of said second carrier network by the ingress node to said second carrier network over a network manager/control network for said second carrier network.

7. A method as claimed in claim 1, wherein the same compression information is used for each frame of traffic in the same traffic flow.

8. A method as claimed in claim 1, wherein said second compression information is placed in a field of said second carrier header.

9. A communications system comprising a client communications network and at least first and second carrier networks, said second carrier network comprising means collectively arranged to implement the method as claimed in claim 1.

10. A data store comprising stored compression information arranged for use in a method as claimed in claim 1, wherein the data store comprises a plurality of data records in which said second compression information is stored in association with one or more of the following:
   said replaced first bender information used for forwarding said frames in said first carrier network;
   said first compression information; and
   said original header information replaced by said first compression information.

* * * * *